United States Patent [19]
Yamamoto et al.

[11] Patent Number: 6,043,798
[45] Date of Patent: Mar. 28, 2000

[54] DISPLAY APPARATUS AND DATA TRANSFER APPARATUS FOR DISPLAY DEVICE

[75] Inventors: Takashi Yamamoto, Yamato; Atsushi Mizutome, Kanagawa-ken, both of Japan

[73] Assignee: Canon Kabushiki Kaisha, Tokyo, Japan

[21] Appl. No.: 08/883,454

[22] Filed: Jun. 26, 1997

[30] Foreign Application Priority Data

Jun. 26, 1996 [JP] Japan .................................. 8-166412

[51] Int. Cl.⁷ ...................................................... G09G 5/00
[52] U.S. Cl. ................................... 345/1; 345/3; 345/103
[58] Field of Search .................... 345/1, 3, 103, 345/87, 88

[56] References Cited

U.S. PATENT DOCUMENTS 4,845,473  7/1989  Matsuhashi et al. .................... 345/103
5,774,105  6/1998  Yamamoto et al. ....................... 345/97

Primary Examiner—Richard A. Hjerpe
Assistant Examiner—Ronald Laneau
Attorney, Agent, or Firm—Fitzpatrick, Cella, Harper & Scinto

[57] ABSTRACT

A display apparatus includes a common data generator unit for generating picture data, a plurality of display units each comprising a display device for displaying pictures based on the picture data, and a picture data transfer line connecting the common data generator unit with the plurality of display units. The plurality of display units include a first display unit comprising a memory characteristic display device and a second display unit comprising a non-memory characteristic display device, which are driven so that data transfer to the first display unit comprising a memory characteristic display device is performed in a blanking period when picture data transfer to the second display unit comprising a non-memory characteristic display device is not performed. As a result, a plurality of display units having different display characteristics, e.g., those including a memory characteristic chiral smectic liquid crystal device and a non-memory characteristic TFT-matrix liquid crystal device, can be driven to simultaneously display mutually closely rotated pictures based on picture data supplied in a time-sharing manner from a common data generator unit.

16 Claims, 18 Drawing Sheets

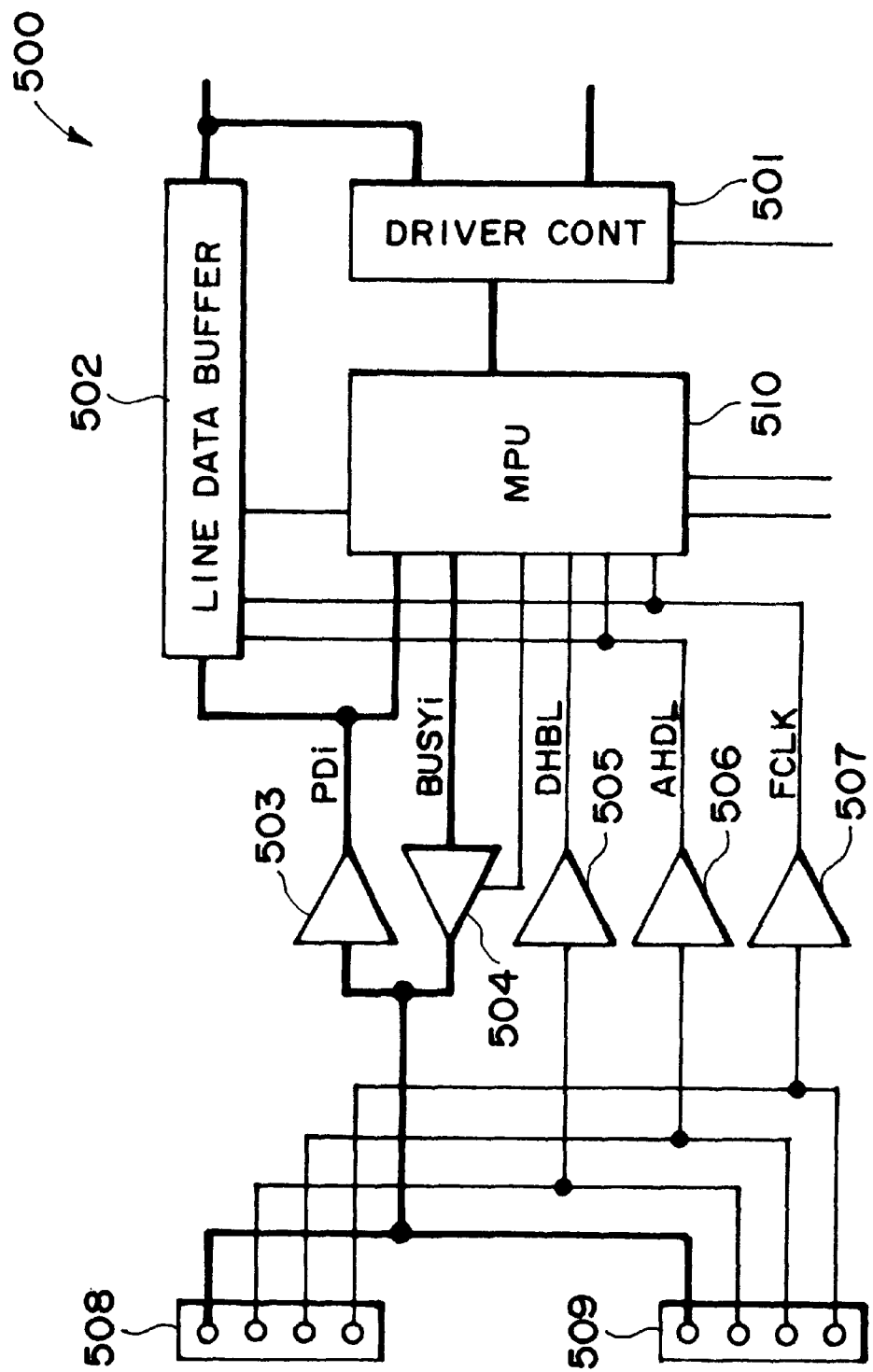
F I G. 5

| | | | | | | | |
|---|---|---|---|---|---|---|---|
| PD0 | A0 | D0 | D16 | D32 | --- | Nx16 | DON'T CARE |
| PD1 | A1 | D1 | D17 | D33 | --- | Nx16+1 | DON'T CARE |
| PD2 | A2 | D2 | D18 | D34 | --- | Nx16+2 | DON'T CARE |
| PD3 | A3 | D3 | D19 | D35 | --- | Nx16+3 | DON'T CARE |
| PD4 | A4 | D4 | D20 | D36 | --- | Nx16+4 | DON'T CARE |
| PD5 | A5 | D5 | D21 | D37 | --- | Nx16+5 | DON'T CARE |
| PD6 | A6 | D6 | D22 | D38 | --- | Nx16+6 | DON'T CARE |
| PD7 | A7 | D7 | D23 | D39 | --- | Nx16+7 | DON'T CARE |
| PD8 | A8 | D8 | D24 | D40 | --- | Nx16+8 | DON'T CARE |
| PD9 | A9 | D9 | D25 | D41 | --- | Nx16+9 | DON'T CARE |
| PD10 | A10 | D10 | D26 | D42 | --- | Nx16+10 | DON'T CARE |
| PD11 | A11 | D11 | D27 | D43 | --- | Nx16+11 | DON'T CARE |
| PD12 | U0 | D12 | D28 | D44 | --- | Nx16+12 | DON'T CARE |
| PD13 | U2 | D13 | D29 | D45 | --- | Nx16+13 | DON'T CARE |
| PD14 | U3 | D14 | D30 | D46 | --- | Nx16+14 | DON'T CARE |
| PD15 | U4 | D15 | D31 | D47 | --- | Nx16+15 | DON'T CARE |

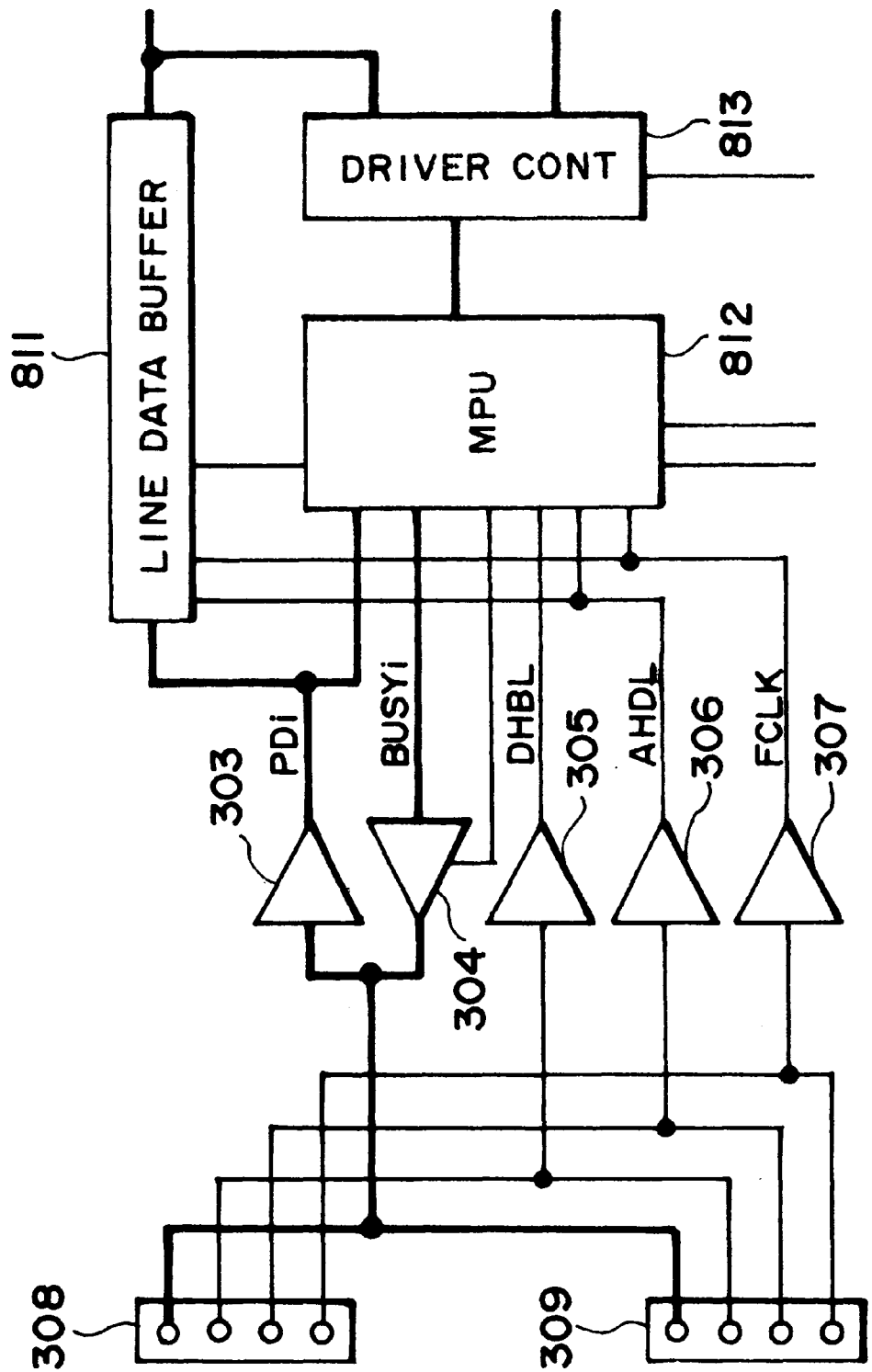
F I G. 20

DISPLAY APPARATUS AND DATA TRANSFER APPARATUS FOR DISPLAY DEVICE

FIELD OF THE INVENTION AND RELATED ART

The present invention relates to a display apparatus provided with a plurality of display devices, particularly a display apparatus provided with such a plurality of display devices including one of a memory characteristic and another of a non-memory characteristic and also a data transfer apparatus including one data generator connected to such a plurality of display devices.

Among known display apparatus, there is one provided with a plurality of display devices for respectively displaying different data so as to comply with a need for simultaneously displaying lots of data. FIG. 22 illustrates an example of such display apparatus provided with a plurality of display devices or display units. Referring to FIG. 22, the display apparatus is provided with CRT display units 1509, 1510 and 1511 which are supplied with picture data from a single data generator unit 1501 via data transfer units (IF) 1506, 1507 and 1508.

In such a conventional display apparatus, one generator unit 1501 requires data transfer units (IF) 1506–1508 independently for the respective display units 1509–1511, and mutually independent connections are required between the data generator 1501 and the respective display units 1509–1511, so that not only the circuit structure but also the connection become complicated. Further, a high-definition CRT display unit is required to have a large screen and correspondingly the display apparatus is caused to have increased depth and weight and thus require a large installation space.

As a solution to the above-mentioned problem, it has been known to use a flat panel-type display unit comprising a liquid crystal display device, a plasma device, an electron discharge device, an electrochromic device, an electroluminescence device, etc. These devices may be divided into a type having a memory characteristic and a type not having a memory characteristic. We have first tried to develop a display apparatus including a plurality of display units comprising memory-type display devices connected to a single data generator unit. Such a memory-type display device can provide advantages of high definition and large screen or picture area. For example, a plurality of ferroelectric liquid crystal devices as memory-type display devices could be connected to one data generator unit via one data transfer line so that a large amount of data display could be realized without using a large amount of memory devices but with a small installation space.

A liquid crystal display unit using such a ferroelectric liquid crystal device has been making a progress day by day but its commercial application has principally relied on an areal gradation display technique so that one pixel thereof can display only a small number of colors. Accordingly, a multi-color display has been effected by binary coding and halftone processing.

However, a display unit using a ferroelectric liquid crystal device is faced with a certain limit in large-size multi-color display and large-size motion picture display. In order to provide an applicability to a variety of uses, we have tried to use such a memory-type liquid crystal device in combination with another liquid crystal display unit, such as one comprising a TFT-liquid crystal display device, suited for multi-color motion picture display to develop a display apparatus.

However, the co-use of such a liquid crystal display unit using a TFT-liquid crystal display involves a problem as described below.

Thus, a memory-type display device as represented by a ferroelectric liquid crystal device has a large temperature-dependence of its drive condition so that its one scanning line drive time can vary on a temperature change and it is necessary to demand display data to the data generator unit at a time interval in commensurate with the one scanning line drive time. On the other hand, as the display device per se has a memory characteristic, a good display can be effected even when picture data transfer is performed at irregular intervals.

In contrast thereto, a non-memory characteristic display device as represented by a TFT-liquid crystal display device or a simple matrix-type display device using an STN liquid crystal requires transfer of identical display data at constant intervals even when an identical picture is displayed due to lack of a memory characteristic. Accordingly, it is difficult to use such a non-memory characteristic display device together with a memory characteristic display device. On the other hand, it may be conceivable to equip a non-memory characteristic display device with a frame memory but this requires a large number of frame memories when a large volume of data is displayed in multiple colors, thus requiring an expensive apparatus. Further, as a large amount of data has to be transferred in a short time, the data transfer apparatus becomes expensive.

SUMMARY OF THE INVENTION

An object of the present invention is to provide a display apparatus including a display unit comprising a memory characteristic display device and a display unit comprising a non-memory characteristic which can be simultaneously driven for picture display.

According to the present invention, there is provided a display apparatus, comprising: a common data generator unit for generating picture data, a plurality of display units each comprising a display device for displaying pictures based on the picture data, and a picture data transfer line connecting the common data generator unit with the plurality of display units, wherein said plurality of display units include a first display unit comprising a memory characteristic display device and a second display unit comprising a non-memory characteristic display device, which are driven so that data transfer to the first display unit comprising a memory characteristic display device is performed in a blanking period when picture data transfer to the second display unit comprising a non-memory characteristic display device is not performed.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5 is a block diagram for illustrating a structure of a TFT display controller for the TFT liquid crystal display device.

FIGS. 16A, 16B, 18A, 18B and 18C respectively illustrate a picture displayed on the liquid crystal display device according to the application.

FIG. 20 is a block diagram for illustrating a structure of a FLC display controller for the FLC display device.

DESCRIPTION OF THE PREFERRED EMBODIMENTS

Figure 1:
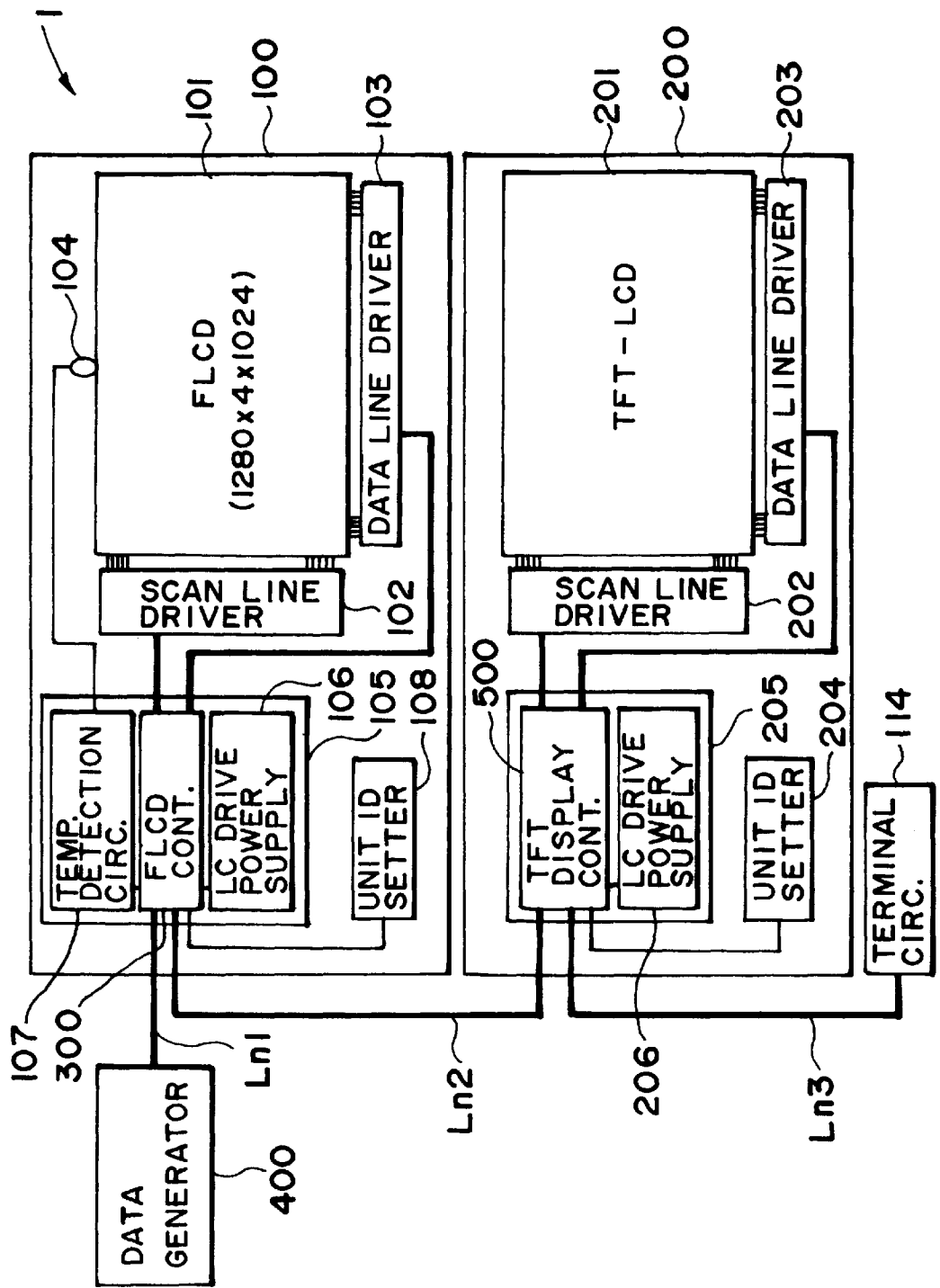
FIG. 1 is a block diagram of a display apparatus according to a first embodiment of the invention.

FIG. 1 is a block diagram of a display apparatus according to a first embodiment of the present invention. Referring to FIG. 1, a display apparatus 1 includes one data generator unit 400, a plurality (two in this embodiment) of liquid crystal display units 100, 200, a terminal circuit 114, and picture data transfer liens Ln1, Ln2 and Ln3 connecting the data generator unit 400, the liquid crystal display devices 100, 200 and the terminal circuit 114.

A first liquid crystal display unit 100 includes a memory characteristic display device using a ferroelectric or anti-ferroelectric chiral smectic liquid crystal (hereinafter called a "FLC display device") 101, a scanning line driver 102 and a data line driver 103 for driving the FLC display device 102, a drive control circuit 105 for supplying scanning signals and data signals as drive signals to the respective drivers 102 and 103, a temperature sensor 104 for detecting the temperature of the display device 101 and a unit ID setting means 108 for setting unit ID for the liquid crystal display unit 100 from outsides.

The FLC display device 101 in the first liquid crystal display unit 100 comprises a chiral smectic liquid crystal device having 1280×1024 pixels each comprising four sub-pixels or dots of R, G, B and W, and the liquid crystal material used is a mixture comprising a biphenyl compound and a phenylpyrimidine compound as principal components and showing the following phase transition series.

$$\text{Cryst.} \xrightarrow{-10^\circ \text{C.}} \text{SmC*} \xrightarrow{63^\circ \text{C.}} \text{SmA} \xrightarrow{72^\circ \text{C.}} \text{Ch.} \xrightarrow{91^\circ \text{C.}} \text{Iso.}$$

Accordingly, the liquid crystal material assumes a chiral smectic phase (SmC*) in an ordinary operation condition of the device 101.

On the other hand, the drive control circuit 105 includes a temperature detection circuit 107, an FLC device controller 300 and a liquid crystal drive power supply 106, and controls the FLC display device 101 based on drive conditions determined by picture data from the data generator unit 400 and a temperature compensation operation described below.

Figure 2:
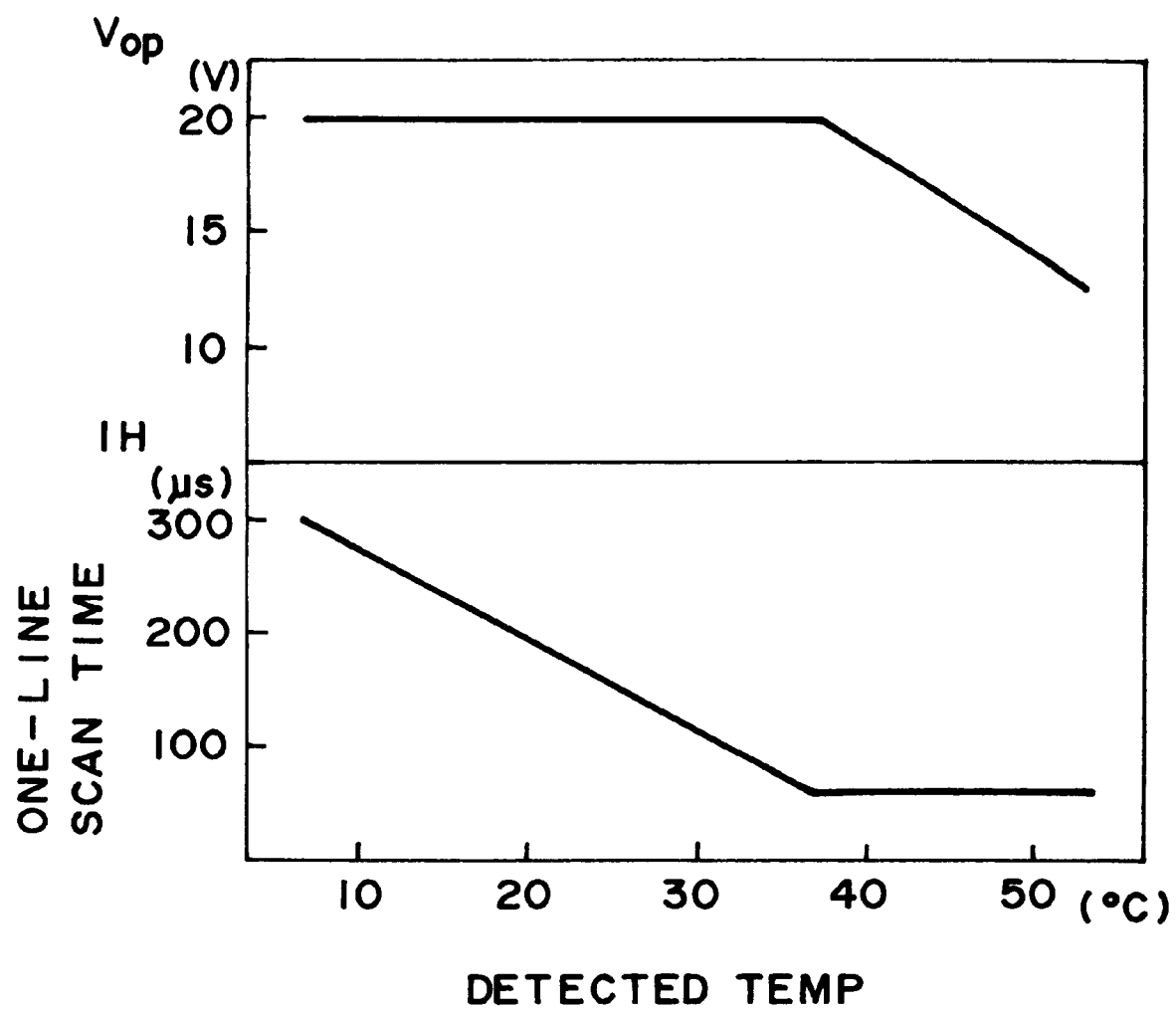
FIG. 2 is a graph for illustrating drive conditions for a FLC display device used in the display apparatus of FIG. 1.

The FLC display device 101 has optimum drive conditions which vary depending on temperatures. More specifically, as shown in FIG. 2 which is a graph showing temperature-dependent conditions, the drive conditions include a drive voltage (Vop) which is a representative voltage in a drive voltage waveform applied to the liquid crystal and a one-horizontal scanning period (1H) which is a period for driving one horizontal scanning line, and optimum values thereof vary so that the product of Vop and 1H decreases at higher temperatures. The FLC display controller 300 selects such optimum drive conditions depending on a temperature measure in proximity to the FLC display device 101. The operation is called a temperature compensation operation.

The FLC display device 101 has a memory characteristic as has been already described so that its display state determined by application of drive voltages is retained even after removing the applied voltages. Accordingly, it is not necessary to always rewrite an entire picture but is possible to preferentially rewrite a portion to be rewritten (partial rewrite drive) or to place a pause period wherein the drive is terminated by placing a pair of electrodes constituting a pixel at identical potentials or in a floating state when the picture need not be rewritten (static drive).

Figure 3:
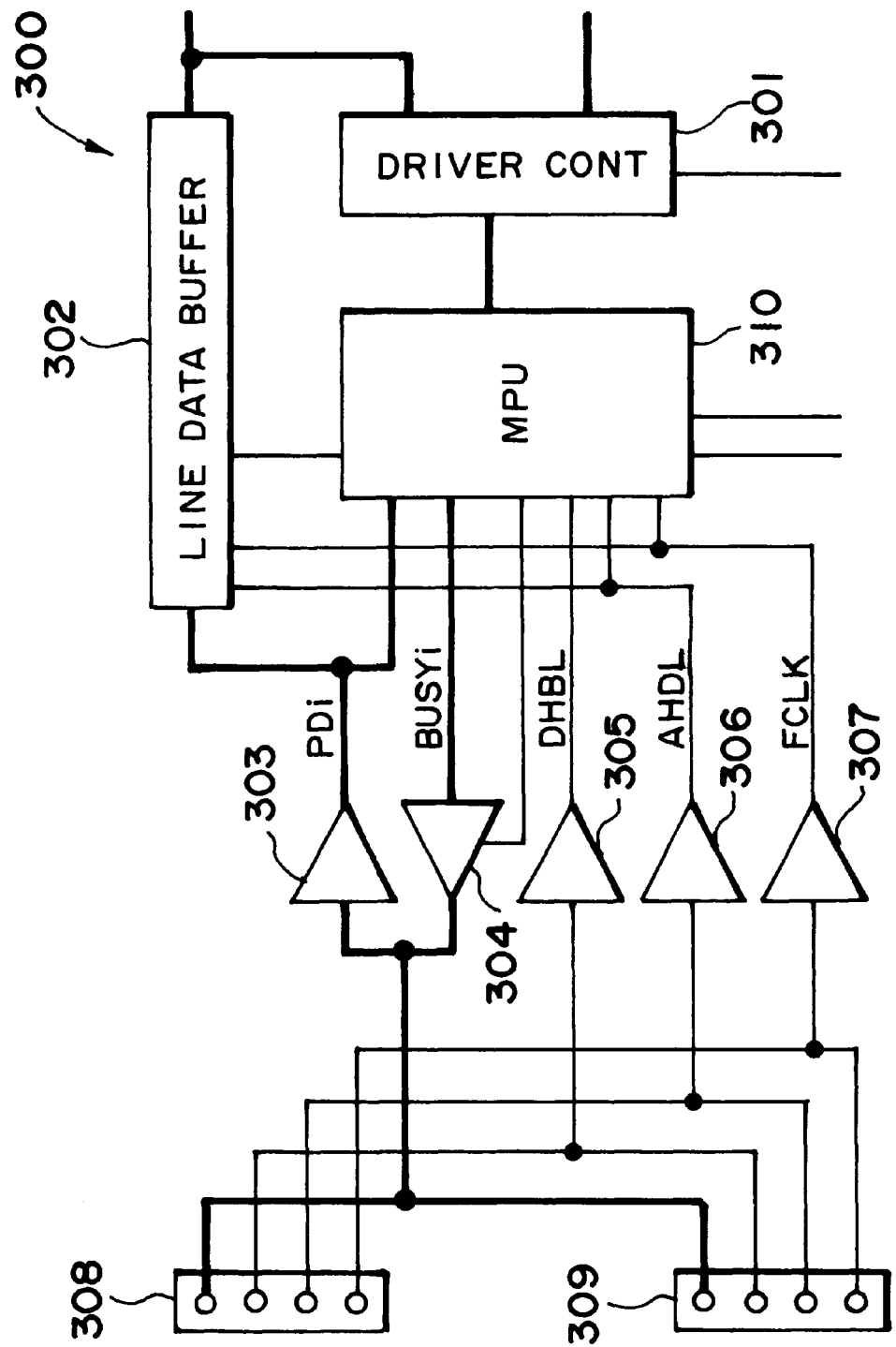
FIG. 3 is a block diagram for illustrating a structure of a FLC display controller for the FLC display device.

FIG. 3 illustrates an organization of the FLC display controller 300, which includes a driver control circuit 301, a line data buffer circuit 302, receivers 303, 305, 306 and 307 for receiving picture data supplied through connectors 308 and 309 from the data generator unit 400, a transmitter 304 for sending a data transfer demand signal to the data generator unit 400, and an MPU 310. The transmitter 304 is designed to control its output at High (H), Low (L) or a high-impedance state depending on a signal from the MPU 310.

Figure 4:
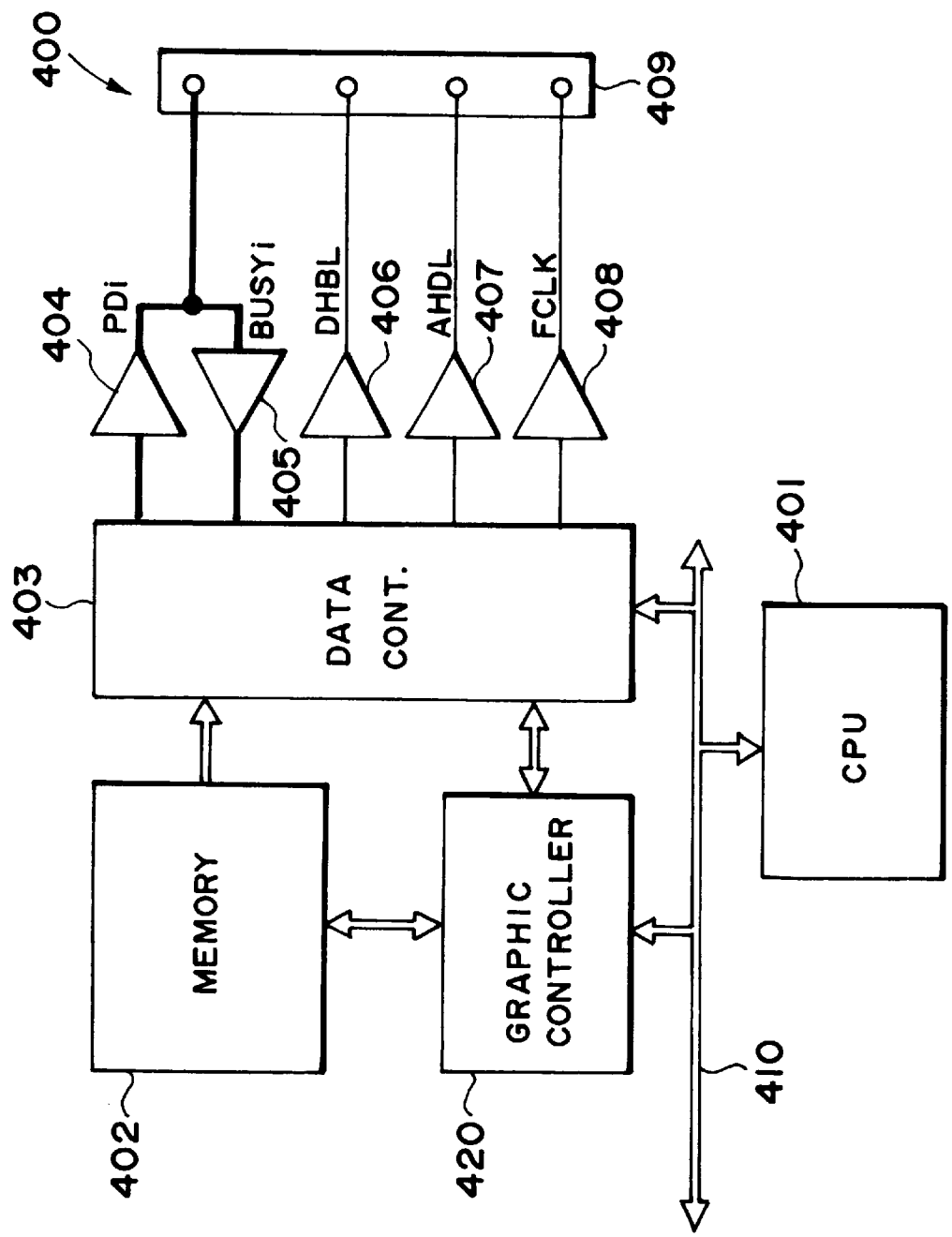
FIG. 4 is a block diagram of principal components in a data generator unit in the display apparatus of FIG. 1.

FIG. 4 illustrates a principal organization of the data generator unit 400, which includes a CPU 401, a memory 402, a data controller 403, a graphic controller 420, internal buses 410 for connecting these units, signal transmitters 404, 406, 407 and 408 for transmitting signals to the liquid crystal controller 300, a receiver 405 and a connector 409. In addition to the above, the data generator unit 400 can further include a keyboard interface unit for inputting data according to a user's manipulation, an interface unit for data exchange with another apparatus, a read only memory, etc.

On the other hand, the second liquid crystal display unit 200 includes a TFT active matrix-type liquid crystal display device 201 as a non-memory characteristic display device. As shown in FIG. 1, the second liquid crystal display unit 201 further includes a scanning line driver 202 and a data line driver 203 for driving the TFT liquid crystal display deice 203, a drive control circuit 205 for supplying scanning signals and data signals as drive signals to the respective drivers 202 and 203, and a unit ID setting means 204 capable of setting unit ID for the liquid crystal display unit 100 from outsides.

The drive control circuit includes a TFT display controller 500 and a liquid crystal drive power supply 206 and controls the TFT display device 201 based on picture data supplied from the data generator unit 400 via the first liquid crystal display unit 100.

FIG. 5 illustrates an organization of the TFT display controller 500, which includes a driver control circuit 501, a line data buffer 502, receivers 503, 505, 506 and 507 for receiving signals from the data generator unit 400, a transmitter 504 for sending a data transfer demand signal to the data generator unit 400, an MPU 510 and connectors 508 and 509. The transmitter 504 is designed to control its output at H, L or a high-impedance state depending on a signal from the MPU 510.

Figure 6:
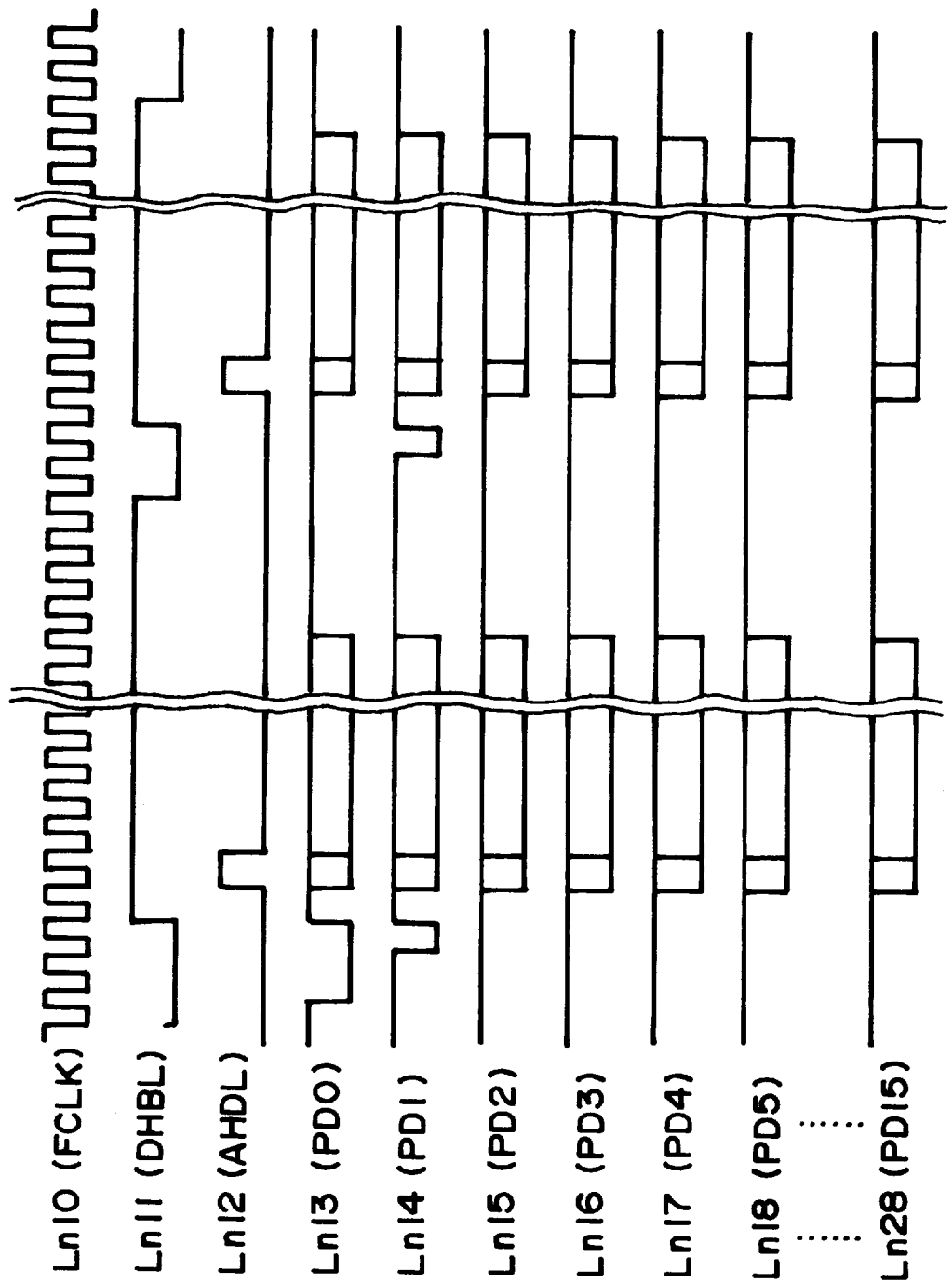
FIG. 6 is a time-serial waveform diagram for illustrating function of signals transferred between the data generator unit and the liquid crystal display devices.

FIG. 6 illustrates an operation of signal-transfer among the data generator unit 400, the first liquid crystal display unit 100 and the second liquid crystal display unit 200 via picture data transfer lines Ln1, Ln2 and Ln3.

Referring to FIG. 6, at Ln10 is shown a clock signal FCLK passed through a clock line, and at Ln13–Ln27 are shown data signals PD0–PD15 transferred in synchronism with the clock signal FCLK from the data generator unit 400 through picture data lines Ln13–Ln18.

Further, at Ln11 are shown a succession of discrimination signals DHBL indicating whether the data signals passed through the picture data lines Ln13–Ln18 are picture data signals or data demand signals. More specifically, H level of DHBL indicates that picture data PD0–PD15 from the data generator unit 400 are sent through the picture data lines Ln13–Ln28, and L level of DHBL indicates that data demand signals from BUSY0–BUSY15 from the respective display controllers 300 and 500 are sent through the picture data lines Ln13–Ln28.

Further, at Ln12 is shown a succession of discrimination signals AHDL sent through an AHDL line. H level of AHDL indicates that the signals PD0–PD15 supplied from the data generator unit 400 comprise scanning line address data for specifying a scanning line and Unit ID for specifying a liquid crystal display unit, and L level of AHDL indicates that the signals PD0–PD15 comprise picture data.

Figures 7A, 7B:
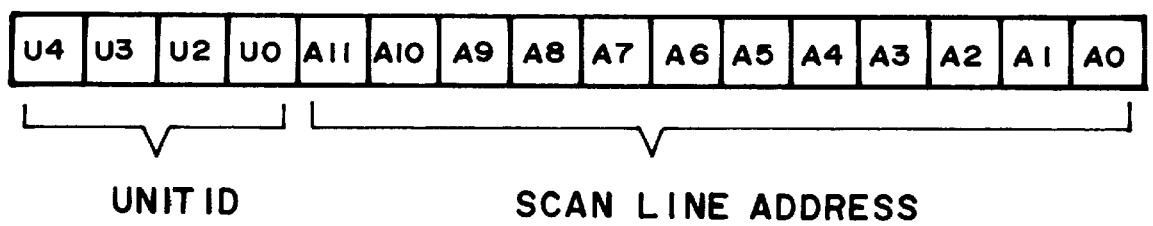
FIGS. 7A and 7B illustrate data format of picture data, line address and Unit ID.

FIG. 7A illustrates picture data format of signals PD0–PD15. FIG. 7B illustrates Unit ID (as a code) for designating a liquid crystal display unit 100 or 200 to be connected and SCAN LINE ADDRESS as an address designation for a scanning line on which a subsequent row of data D0–D5119 (1280×4 data) is to be displayed.

Now, an operation of the display apparatus according to this embodiment will be described. First, an operation of the data generator unit 400 is described.

The data generator unit 400 (FIGS. 1 and 5) is operated according to a program stored in a memory means (not shown) and operated on the CPU 401 to store picture data to be displayed on the first and second liquid crystal display units 100 and 200 in a memory 402 through a graphic controller 420. The picture data stored in the memory 402 are transferred to the liquid crystal display unit 100 or 200 according to the data controller 403.

More specifically, when transfer of picture data for one scanning line is ready, the data controller 403 supplies "L" of the signal DHBL. On the other hand, signal lines BUSYi (i=0–15) correspond to up to 16 liquid crystal display units ready for data receipt and "L" is sent by the data controller 403 to BUSYi corresponding to UNIT ID, thereby receiving data transfer demand. On receiving the data transfer demand from a liquid crystal display unit to which picture data should be sent, the data controller 403 sends out "H" of DHBL, thereby prohibiting data transfer demand thereafter.

Then, according to the formats shown in FIGS. 7A and 7B, the data controller 403 sends out picture data PDi (i=0–15) for one scanning line preceded by Unit ID and a scanning line address. The level "H" of AHDL indicates the commencement of picture data transfer in addition to the supply of Unit ID and scanning line address.

Now, an operation of the first liquid crystal display unit 100 is described.

The temperature detection circuit 107 receives temperature data of the FLC display device 101 from the temperature sensor 104 and sends the temperature data to the MPU 310 of the FLC display controller 300. Then, MPU 310 refers to a temperature compensation table based on characteristics as shown in FIG. 2 stored in a ROM or RAM contained therein or an externally provided memory device and determines an optimum drive voltage (Vop) and one-horizontal scanning period (1H) based on the received temperature data.

The thus-determined drive voltage is generated in the liquid crystal drive power supply 106 (FIG. 1) based on a signal from the MPU 310 and supplied to the scanning line driver 102 and the data line driver 103 through the driver control circuit 301.

When the condition for driving the FLC display device 101 is ready, MPU 310 supplies "L" to a specific signal BUSYi corresponding to Unit ID set in the Unit ID setting means 108 specified externally among signals BUSYi in a period of "L" of DHBL from the data generator unit 400. For example, when "0" set in the Unit ID setting means 108, "L" is sent to BUSY0.

Thereafter, MPU 310 continually monitors DHBL and, when "H" of DHBL is detected, releases the transmitter 304 of BUSYi. Then, when AHDL assumes "H", MPU 310 takes in PDi (i=0–15) and decode Unit ID.

Then, in case where the decoded Unit ID is identical to the value given by the unit ID setting means 108, i.e., when the data supplied from the data generator unit 400 is those supplied to the display unit 100, MPU 310 instructs the line data buffer 302 to store the picture data and simultaneously decode the scanning line address to notify the driver control circuit 301.

Further, when the picture data are stored in the line data buffer 302, MPU 310 instructs the driver control circuit 301 to effect a drive for one scanning line, so that the driver control circuit 301 controls the scanning line driver 102 and the data line driver 103. Accordingly, the picture data are transferred from the line data buffer 302 to the data line driver 103 to display picture data for one line on the FLC display device 101.

On the other hand, when the decoded Unit ID is different from the value given by the Unit ID setting means 108, MPU 310 again monitors the signal DHBL and, when DHBL becomes "L", demands a data transfer. Until receiving fresh picture data, MPU 310 does not write in the FLC display device 101 and the display state on the FLC display device 101 is retained due to it is memory characteristic.

MPU 310 has been described as containing a CPU and operating on a program code but need not contain a CPU as far as it can effect the above-described operation.

Next, an operation of the second liquid crystal display unit 200 is described.

The second liquid crystal display unit 200 operates in an almost similar manner as the first liquid crystal display unit 100 except that the TFT liquid crystal display device 201 is driven under constant drive conditions. Thus, MPU 510 shown in FIG. 5 controls the liquid crystal drive power supply 206 to supply drive voltages to the TFT display device 201.

Further, when the condition for driving the TFT liquid crystal display device 201 is ready, MPU 510 supplies "L" to a specific BUSYi corresponding to Unit ID set in the Unit ID setting means 108 among signals BUSYi in a period of "L" of DHBL from the data generator unit 400. For example, when "1" is set in the Unit ID setting means 108, "L" is sent to BUSYi.

Thereafter, MPU 510 continually monitors DHBL and, when "H" of DHBL is detected, releases the transmitter 504 of BUSYi. Then, when AHDL assumes "H", MPU 510 takes in PDi (i=0–15) and decode Unit ID.

Then, in case where the decoded Unit ID is identical to the value given by the unit ID setting means 204, i.e., when the data supplied from the data generator unit 400 is those supplied to the display unit 200, MPU 510 instructs the line data buffer 502 to store the picture data and simultaneously decode the scanning line address to notify the driver control circuit 501.

Further, when the picture data are stored in the line data buffer 502, MPU 510 instructs the driver control circuit 501 to effect a drive for one scanning line, so that the driver control circuit 501 controls the scanning line driver 202 and the data line driver 203. Accordingly, the picture data are transferred from the line data buffer 502 to the data line driver 203 to display picture data for one line on the TFT display device 201.

On the other hand, when the decoded Unit ID is different from the value given by the Unit ID setting means 204, MPU 510 again monitors the signal DHBL and, when DHBL becomes "L", demands a data transfer. MPU 520 effects a data demand for each horizontal scanning period and the transfer of picture data for one line has to be completed in the horizontal scanning period. Further, MPU 510 does not demand data transfer in a period (blanking period) corresponding to a vertical fly-back time of the TFT display device 201.

MPU 510 has been described as if it contains a CPU and operates on a program code but need not contain a CPU as far as it can effect the above-described operation, similarly as in the case of the first liquid crystal display unit 100.

In the above, the operation of the first and second liquid crystal display units 100 and 200 and of the data generator unit 400 have been described. As mentioned above, however, because of the temperature-dependent drive characteristic, the optimum one-horizontal scanning period of the FLC display device 101 can vary depending on a change in environmental temperature and the time interval between data demands for the first liquid crystal display unit 100 is not constant. Further, as for the second liquid crystal display unit 200, the data demand is effected at constant time intervals and the data transfer has to be completed within a constant period. Accordingly, a data transfer scheduling has to be made for adjusting the two drive schemes. The data transfer scheduling is performed in the data controller 403 (FIG. 4) as illustrated in FIG. 8.

Figure 8:
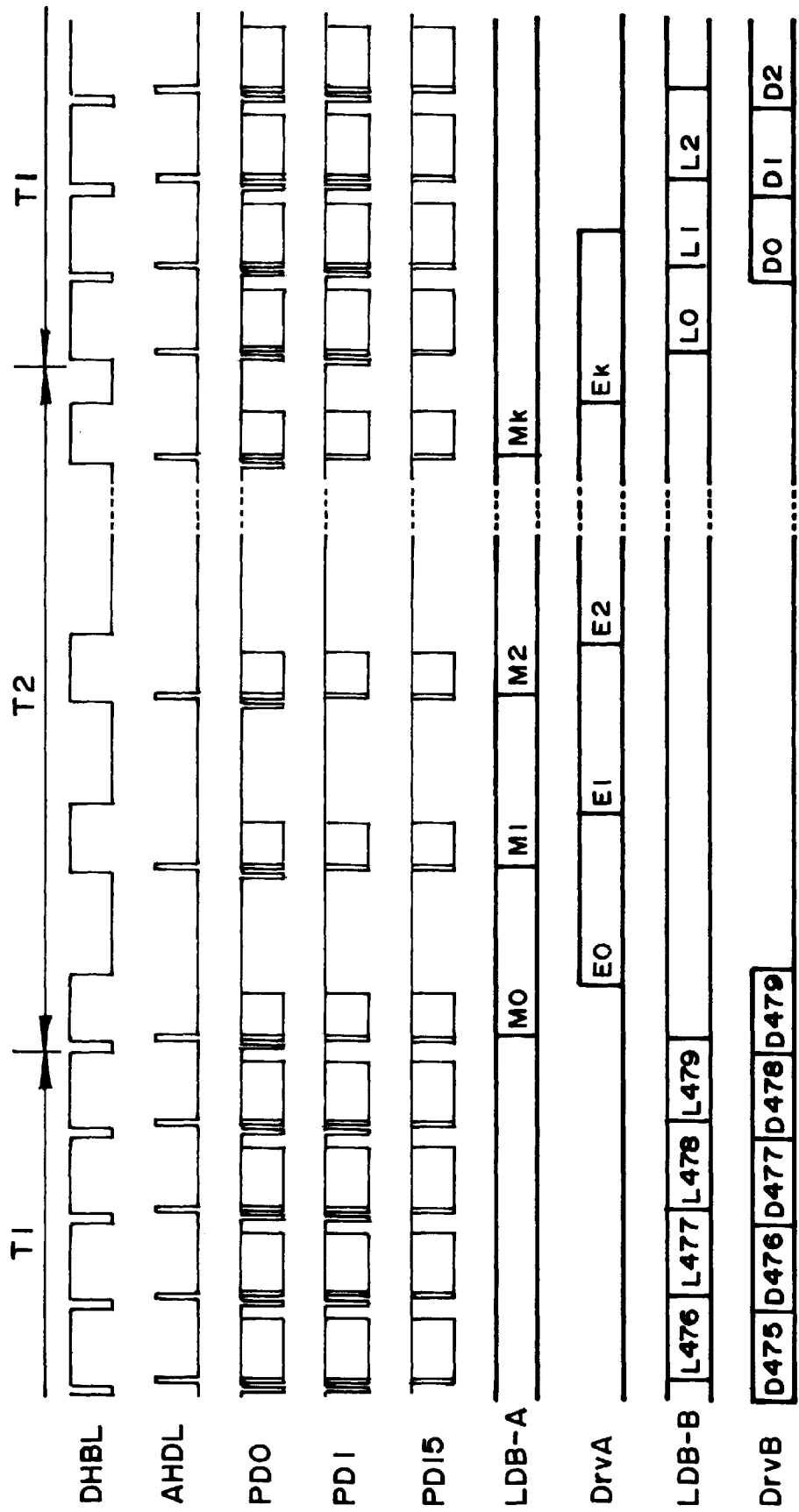
FIG. 8 illustrates a schedule of data transfer performed by a data controller in the data generator unit.

As shown in FIG. 8, in a period of "L" of DHBL set by the data controller 403, the FLC display controller 300 and the TFT controller 500 set their demand signals BUSY0 and BUSY1 to be "L" to demand a picture data transfer if they are in a state ready for receiving fresh one line data.

In a period T1, priority is given to the display on the second liquid crystal display unit 200 and, as soon as the signal PD1 becomes "L", the data controller 403 supplies one-line picture data L1 together with Unit ID for the second liquid crystal display unit 200. The picture data L1 (shown at LDB-B) received by the line data buffer 502 of the second liquid crystal display unit 200 is displayed in a drive period D1 consecutively from an immediately preceding drive period D0. After completing the transfer of the picture data L1, the data controller 403 sets the signal DHBL to be "L" and repeats a similar cycle of operation until a prescribed number of display lines (e.g., the number of total scanning lines) of the TFT display device 201 is reached.

On the other hand, when one frame scanning of the second liquid crystal display unit 500 is completed and a vertical fly-back period T2 is commenced, no data transfer is demanded by the TFT display controller, so that the data controller 403 complies with data demand by the FLC display controller and second out picture data M0 together with Unit ID for the first liquid crystal display unit 100. Then, the picture data M0 (shown at LDB-A in FIG. 8) received by the time data buffer 302 is displayed on the FLC display device 101 in a drive period E0.

Similarly as in the period T1, after completion of the picture data transfer, the data controller 403 sets the signal DHBL to be "L" for inviting a data demand and, in reply thereto, the FLC display controller 300 lowers the signal BUSY0 to demand a data transfer, when it is ready to receive subsequent data, whereby subsequent picture data M1 is transferred. In other words, in the period T2 corresponding to the vertical fly-back time of the second liquid crystal display unit 200, picture data is transferred at a cycle period of 1H of the FLC display device 101.

Then, in a subsequent period T1 after the vertical fly-back time and corresponding to a subsequent one-frame scanning period of the second liquid crystal display unit 200, a data demand is again issued by the TFT display controller 500. When the data controller 403 once receiving a data demand from the TFT display controller 500, the data controller 403 preferentially supplies picture data to the second liquid crystal display unit 200 until a prescribed number of display lines (a number of the total scanning lines in this embodiment) of the TFT display device 201 is reached even if the FLC display controller 300 simultaneously demands a data transfer during that period.

In a specific example of this embodiment, the first liquid crystal display unit 100, the second liquid crystal display unit 200 and the picture data buses may have the following specifications:

[First liquid crystal display unit]
  Display device: FLC
  Number of colors: 16 colors
  Number of pixels per line: 1280 pixels (4 bits/pixel)
  Number of lines: 1024 lines
  One horizontal scan period (1H): 64–320 $\mu$sec

[Second liquid crystal display unit]
  Display device: TFT-liquid crystal
  Number of colors: 4096
  Number of pixels per line: 640 pixels (12 bits/pixel)
  Number of lines: 480 lines
  Horizontal frequency: 31.47 kHz Vertical frequency: 59.94 Hz
Vertical fly-back time: 1.43 msec
[Picture data bus]
Number of bits/bus: 16 bits
Transfer clock signal: 25 MHz As is understood from the above table, the second liquid crystal display unit 200 is designed to have a vertical fly-back time (period T2) of 1.43 msec and a period T1 of ca. 15.25 msec (=1000/59.94−1.43). On the other hand, in the case where the first liquid display unit 100 is driven at 1H=64 μsec at room temperature, picture data for 23 lines (=ca. 1.43/0.064) of the first liquid crystal display unit 100 can be transferred within a period T2. This corresponds to a frame frequency of ca. 1.3 Hz (=23×59.94/1024). Thus, the second liquid crystal display unit 200 at a frame frequency of 59.94 Hz and the first liquid crystal display unit at a frame frequency of 1.3 Hz are driven simultaneously. In other words, the second liquid crystal display unit 200 receives picture data in an amount per unit time which is almost 46 times that received by the first liquid crystal display unit 100.

As mentioned above, in the first liquid crystal display unit 100 using a FLC display device 101 having a memory characteristic, the entire picture need not be rewritten, but a portion to be written can be preferentially (partial rewrite drive) or a picture can remain in a non-driven state during a time period wherein the picture need not be written (static drive), so that a display consisting principally of a still picture can be practically driven without problem even at such a low frame frequency.

Figure 9:
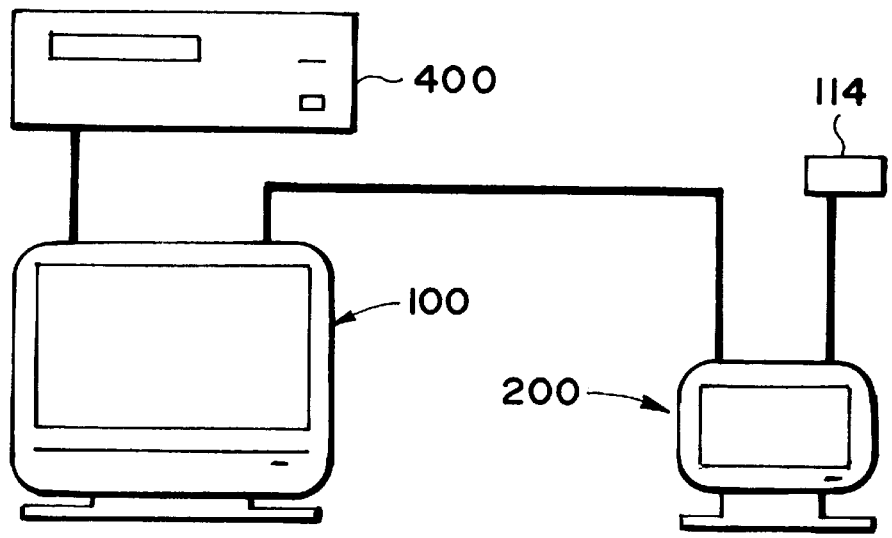
FIG. 9 illustrates an application of the display apparatus according to the first embodiment.

FIG. 9 illustrates an application example of the display apparatus of this embodiment, wherein a first liquid crystal display unit 100 and a second liquid crystal display unit 200 are connected to a personal computer 400 as a data generator unit, in which an application program including a motion picture and a description of the motion picture to users is operated.

Figures 10A, 10B:
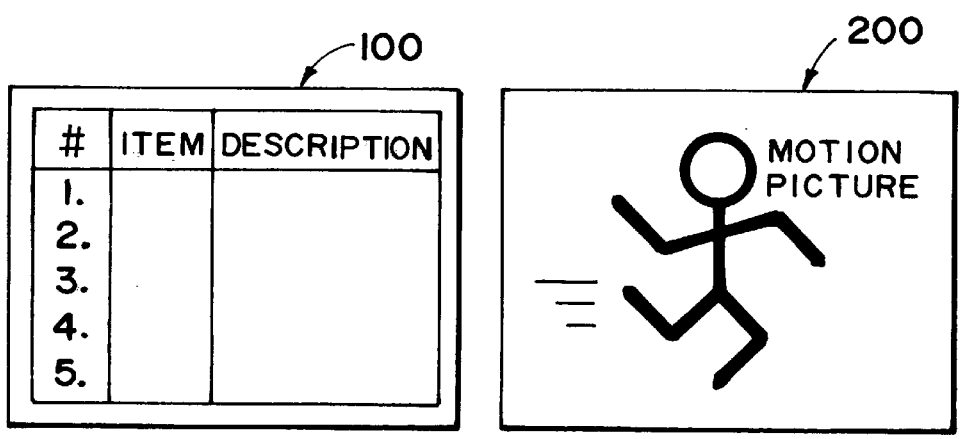
FIGS. 10A, 10B, 11A and 11B respectively illustrate a picture displayed on the liquid crystal display device according to the application.

FIGS. 10A and 10B illustrate pictures displayed on the two liquid crystal display units 100 and 200, respectively. As shown in FIG. 10A, the first liquid crystal display unit 100 displays a picture principally comprising descriptive data including item-by-item descriptions. The picture is principally composed of still picture but can exhibit a sufficient reaction speed for a motion of a cursor, etc., in response to a user's manipulation, so that the user can specify particular data on this picture (screen).

On the other hand, as shown in FIG. 10B, the second liquid crystal display unit 200 is designed to display data designated by a user in the form of a full-motion picture. As a result, the user is provided with a single display system including the first liquid crystal display unit 100 characterized by a high definition and the second liquid crystal display unit 200 optimum for multi-color motion picture display for displaying harmonized pictures.

Figures 11A, 11B:
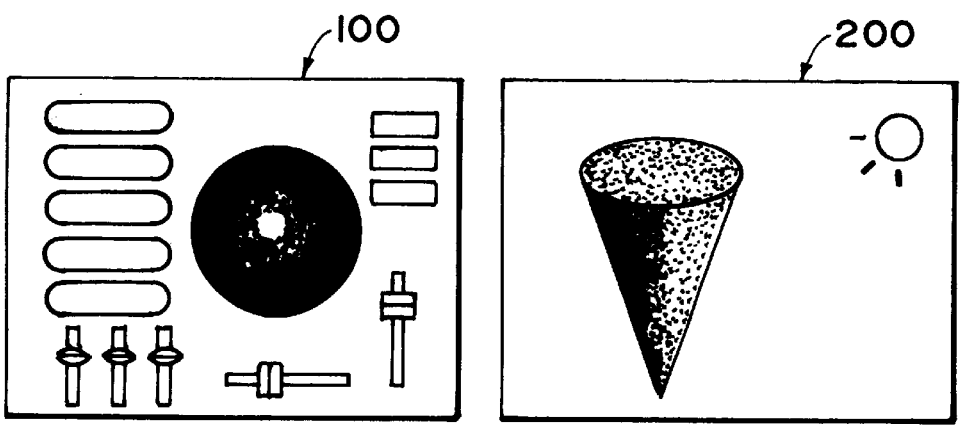

FIGS. 11A and 11B illustrate pictures displayed on the two liquid crystal display units 100 and 200 based on another application program. As shown in FIG. 11B, the second liquid crystal display unit 1200 displays, e.g., results of rendering (shading of figures) by computer graphic, and the first liquid crystal display unit 100 displays a picture for setting the rendering conditions.

Various parameters may be present in the rendering conditions and, according to a conventional application program, there has been taken a procedure of first selecting a parameter or a group of parameters and then manipulating the selected parameter(s) on a subsequent picture. Now, the first liquid crystal display unit 100 provides a high-definition and large-area picture capable of simultaneously displaying many parameter manipulation regions and thus unnecessitating a repetition of troublesome menu operations. Further, the rendering results are always displayed on the second liquid crystal display unit, so that the parameter change in manipulation can be continued while checking the results thereof.

As described above, according to this embodiment, a first liquid crystal display unit 100 having a memory characteristic and capable of displaying a high-definition and large area picture and a second liquid crystal display unit 200 capable of easily displaying multi-color motion pictures can be connected to a single data generator unit 400, thus allowing simultaneous enjoyment of advantages of the liquid crystal display units having different characteristics.

Further, as the liquid crystal display units 100 and 200 having mutually different characteristics are connected to a single data generator unit, the data generator unit 400 is allowed to supply mutually closely associated data to the two liquid crystal display units. Further, the two liquid crystal display units 100 and 200 may be easily connected in series with a single picture bus, thus facilitating the user's connecting operation.

Next, a description will be made on a second embodiment wherein the already-described first liquid crystal display unit 100 is provided with a display controller having a different organization so as to provide a liquid crystal display unit including a FLC display device with further improved performances with reference to FIGS. 12–18 wherein identical or like numerals are used to denote identical or corresponding members as in the figures for illustrating the first embodiment.

Figure 12:
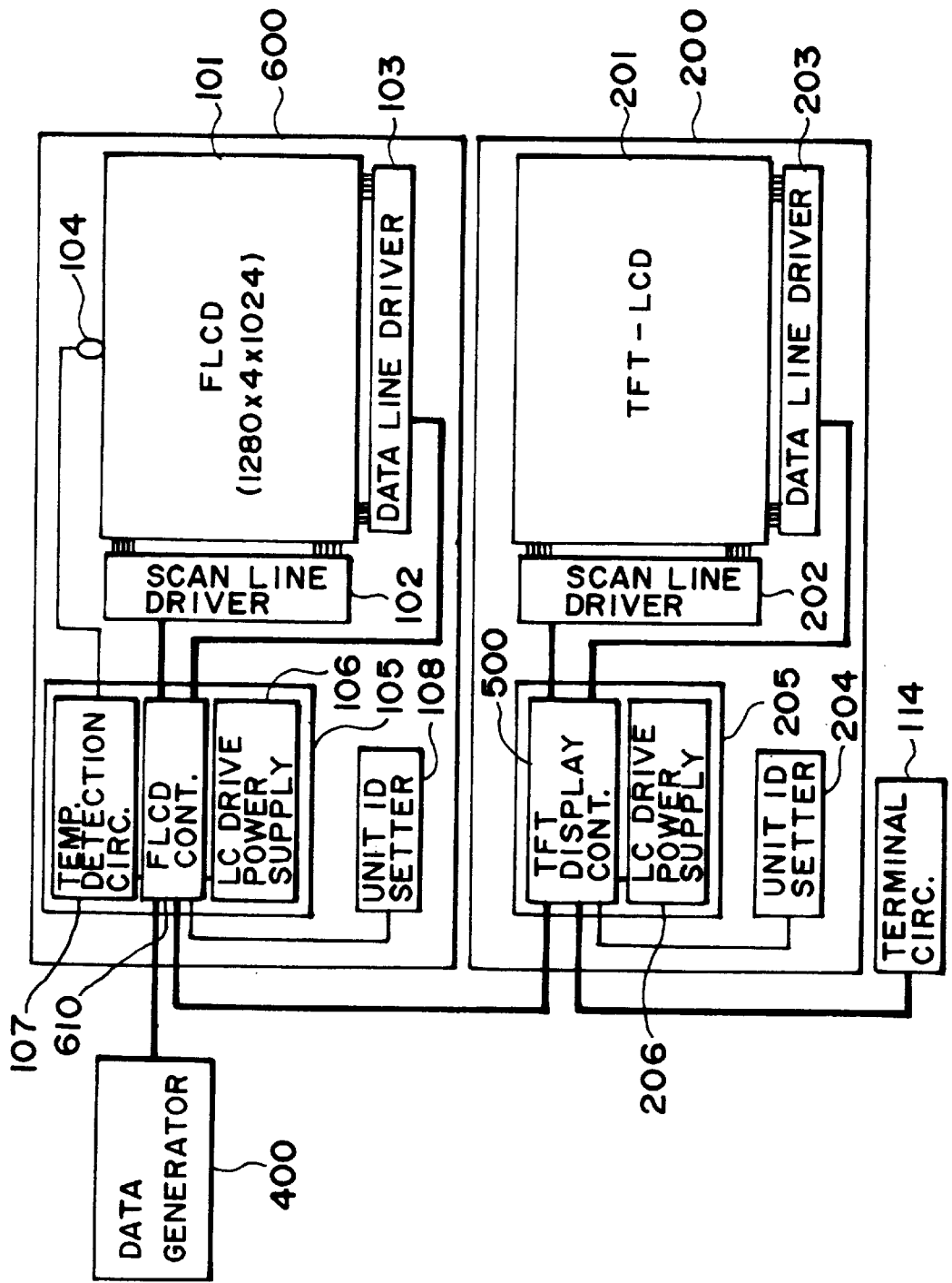
FIG. 12 is a block diagram of a display apparatus according to a second embodiment of the invention.

FIG. 12 is a block diagram of a display apparatus according to this embodiment, including a third liquid crystal display unit 600 which in turn includes an FLC display device 101 and an FLC display controller 601 having a line memory as memory means for storing data for a plurality of lines.

Figure 13:
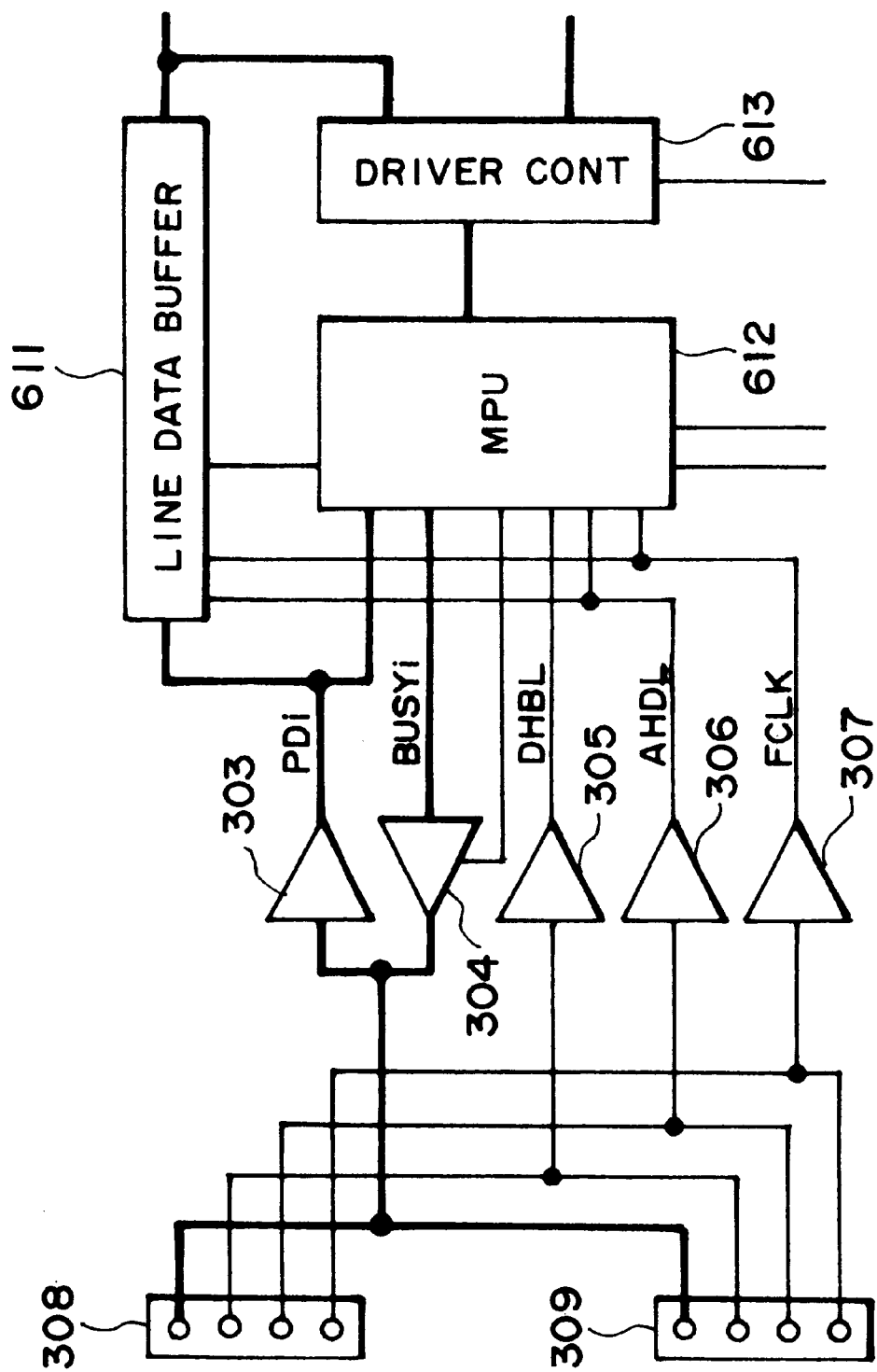
FIG. 13 is a block diagram for illustrating a structure of a FLC display controller for the FLC display device.

As shown in FIG. 13, the FLC display controller 610 includes a line data buffer 611 (as such a line memory), which has a capacity of storing picture data and scanning addresses for 86 lines. The capacity of the line data buffer 611 is determined based on a maximum quantity of picture data that can be received by the third liquid crystal display unit 600 within a vertical fly-back time of a second liquid crystal display unit 200.

MPU 612 in the FLC controller 610 determines a drive voltage and one-horizontal scanning period for driving the FLC display device 101 under a detected temperature condition. When the condition for driving the FLC display device 101 is ready, MPU 612 supplies "L" to a specific signal BUSYi corresponding to Unit ID preliminarily set from outside in Unit ID setting means 108 among signals BUSYi in a period of "L" of DHBL. For example, when "0" is set in the Unit ID setting means 108, "L" is sent to BUSY0.

Thereafter, MPU 612 monitors DHBL and, when "H" of DHBL is detected, releases the transmitter 304 of BUSYi. Then, when AHDL assumes "H", MPU 612 takes in signals PDi (i=0–15) and decode Unit ID.

Then, in case where the decoded Unit ID is identical to the value given by the Unit ID setting means 108, i.e., when the data supplied from the data generator unit 400 is those supplied to the display unit 600, MPU 612 instructs the line data buffer 611 to store the picture data. At this time, in case where the driver control circuit 613 can initiate a drive for a subsequent one scanning line, MPU 612 decodes the scanning line address to notify the drive control circuit 613 and, after waiting for storage of picture data in the line data buffer 611, instructs the drive control circuit 613 to effect a drive for one scanning line.

On the other hand, in the case where the drive control circuit 613 is continuing a previous drive, MPU 612 stores the scanning line address data together with received picture data in the line buffer 611. When picture data for one line is stored in the line data buffer 611, MPU 612 returns to monitor the signal DHBL so as to continue storing of picture data as far as the line data buffer 611 leaves a blank space and second "L" leaves a blank space and send "L" to the signal BUSYi in the period of "L" of DHBL.

Thereafter, the already described picture data-receiving cycle is repeated. When the driver control circuit 613 can initiate a drive for a subsequent one scanning line, MPU 612 reads out a scanning line address data from the line data buffer 611 and decode it to notify and instruct the diver control circuit 613 to initiate a drive. Further, picture data is transferred from the line data buffer 611 to the data line driver 103 to effect a display of picture data for one line on the FLC display device 101.

On the other hand, when the decoded Unit ID is different from the value given by the Unit ID setting means 108, MPU 612 again monitors the signal DHBL and, when DHBL assumed "L", demands a data transfer. As far as picture data not yet displayed remains in the line data buffer 611, MPU 612 continues the operation for driving the FLC display device 101. Further, in case where yet-undisplayed picture data does not remain in the line data buffer 611, MPU 612 does not write in the FLC display device 101 but retains the display state on the FLC display device 101 because of its memory characteristic until it receives fresh picture data.

MPU 612 has been described as containing a CPU and operating on a program code but need not contain a CPU as far as it can effect the above-described operation.

Figure 14:
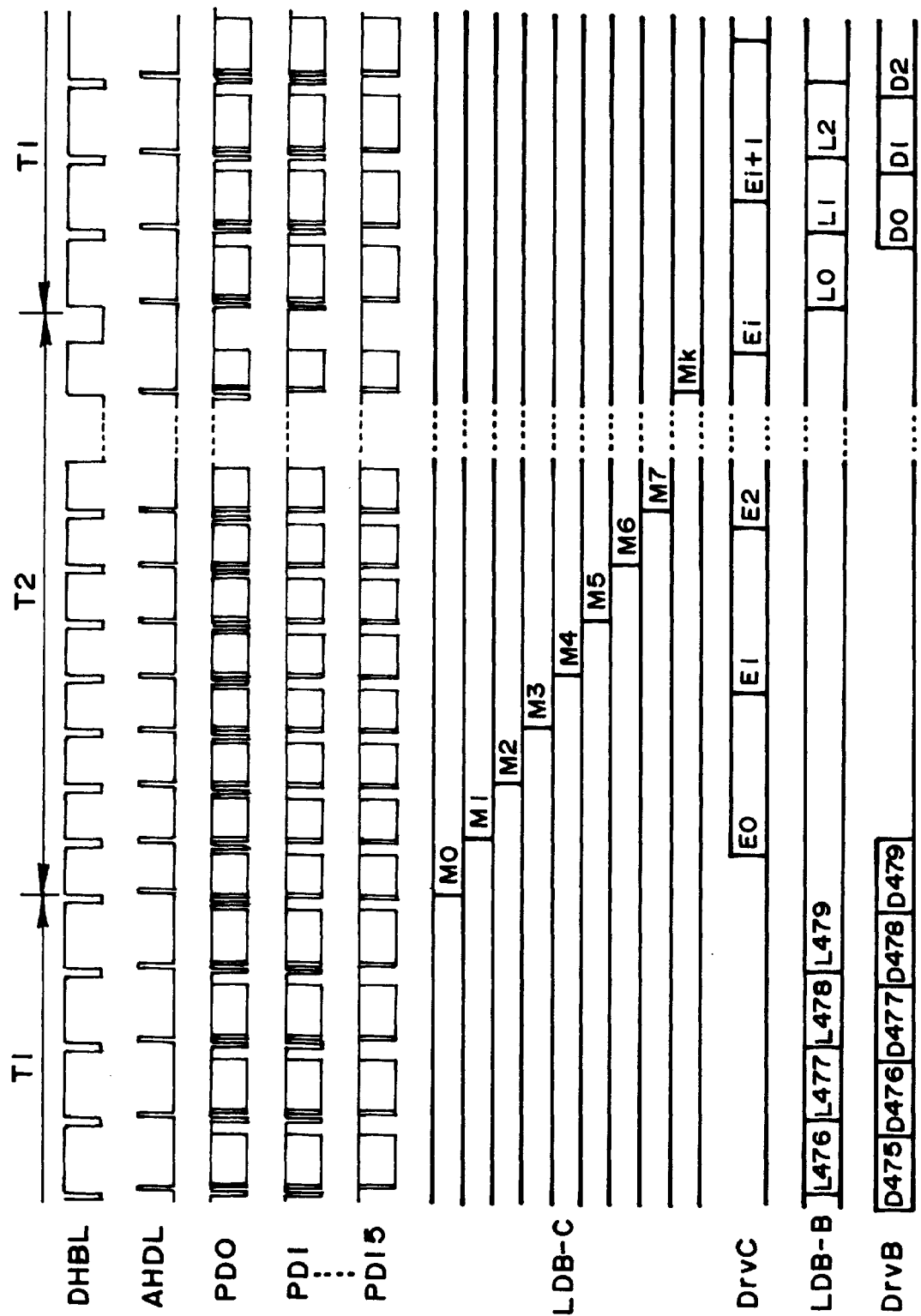
FIG. 14 illustrates a schedule of data transfer performed by a data controller in the data generator unit of the display apparatus.

FIG. 14 is a time chart for illustrating a schedule of data transfer performed by the data controller 403 in the data generator unit 400, and drive of the third liquid crystal display unit 600 and the second liquid crystal display unit 200.

Referring to FIG. 14, in a period of "L" of DHBL set by the data controller 403, the FLC display controller 610 and the TFT controller 500 set the corresponding signal PDi to be "L" to demand a picture data transfer if they are in a state ready for receiving fresh one line data.

In a period T1, priority is given to the display on the second liquid crystal display unit 200 and, as soon as the signal BUSY1 corresponding to Unit ID of the second liquid crystal display unit 200 becomes "L", the data controller 403 supplies one-line picture data L1 together with Unit ID for the second liquid crystal display unit 200. The picture data L1 (shown at LDB-B) received by the line data buffer 502 of the second liquid crystal display unit 200 is displayed in a drive period D1 consecutively from an immediately preceding drive period D0. After completing the transfer of the picture data L1, the data controller 403 sets the signal DHBL to be "L" and repeats a similar cycle of operation until a prescribed number of display lines of the TFT display device 201 is reached.

On the other hand, when a vertical fly-back period T2 is commenced, no data transfer is demanded by the TFT display controller, so that the data controller 403 complies with data demand by the FLC display controller 610 and sends out picture data M0 together with Unit ID for the third liquid crystal display unit 600. Then, the picture data M0 (shown at LDB-C in FIG. 14) received by the line data buffer 611 is displayed on the FLC display device 101 in a drive period E0.

Similarly as in the period T1, after completion of the picture data transfer, the data controller 403 sets the signal DHBL to be "L" for inviting a data demand and, in reply thereto, the FLC display controller 610 immediately lowers the signal BUSY0 to demand a data transfer as far as a blank space is present in the line data buffer 612 and regardless of 1H period, whereby subsequent picture data M1 is transferred. In other words, in the period T2 corresponding to the vertical fly-back time of the second liquid crystal display unit 200, picture data is transferred at a cycle period determined by adding an overhead (an extra time, e.g., for preparation between transfers, e.g., 0.5 $\mu$sec to the picture data transfer time to the third liquid crystal display unit 600.

Then, in a subsequent period T1 after the vertical fly-back time of the second liquid crystal display unit 200, a data demand is again issued by the TFT display controller 500. When the data controller 403 once receiving a data demand from the TFT display controller 500, the data controller 403 preferentially supplies picture data to the second liquid crystal display unit 200 until a prescribed number of display lines of the TFT display device 201 is reached even if the FLC display controller 610 simultaneously demands a data transfer during that period. Further, in that period, the FLC display controller 610 continues drives Ei to Ek (not shown) based on the data stored in the line data buffer 611.

The specification of the third liquid crystal display unit 600 used in this embodiment is similar to that of the first liquid crystal display unit 100 in the previous embodiments, but pixel data for 86 lines (=1.43 msec/16.5 $\mu$sec) of the third liquid crystal display unit 600 can be transferred in the period T2. This is because the picture data transfer cycle period including the overhead (one line picture data transfer period+overhead) is shortened to 16.5 $\mu$sec (=1280 pixels×4 bits/pixels/{16 bit-bus/clock×20 MHz clock}+0.5 $\mu$sec) and this corresponds to a frame frequency of ca. 5.0 Hz (=86× 59.94/1024). Thus, the second liquid crystal display unit 200 at a frame frequency of 59.94 Hz and the third liquid crystal display unit 600 at a frame frequency of 5.0 Hz are driven simultaneously.

The third liquid crystal display unit 600 using the FLC display device 101 having a memory characteristic can be driven without practical problem even at a low frame frequency similarly as in the first embodiment but can provide further improved display performances than in the first embodiment.

Figure 15:
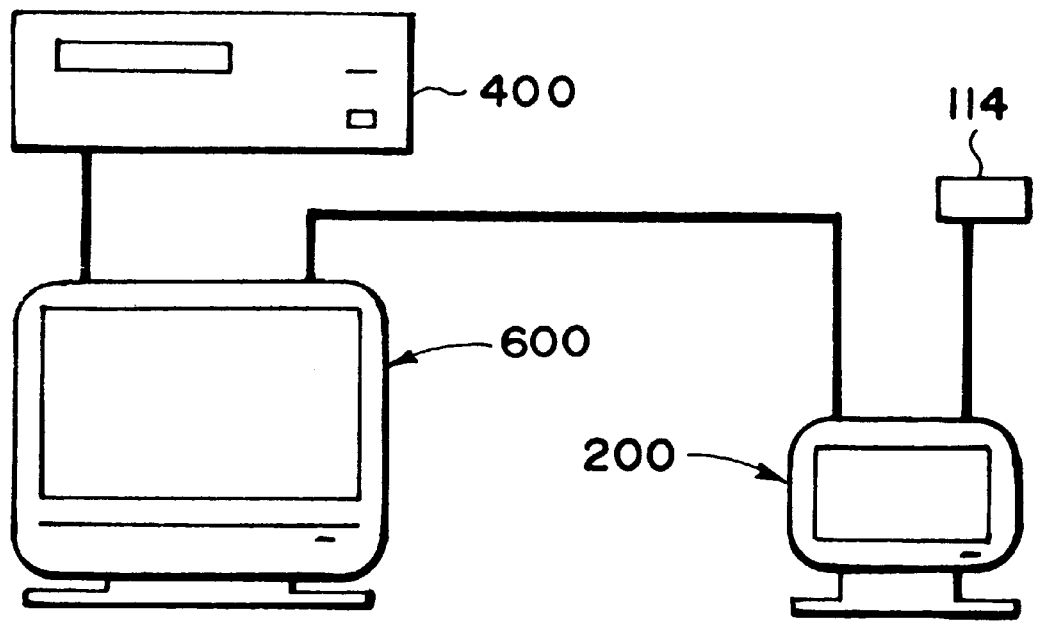
FIGS. 15 and 17 respectively illustrate an application of the display apparatus according to the first embodiment.

FIG. 15 illustrates an application example of the display apparatus of this embodiment, wherein a third liquid crystal display unit 600 and a second liquid crystal display unit 200 are connected to a personal computer 400 as a data generator unit, in which an application program including a motion picture and a description of the motion picture to users is operated.

Figure 16A:
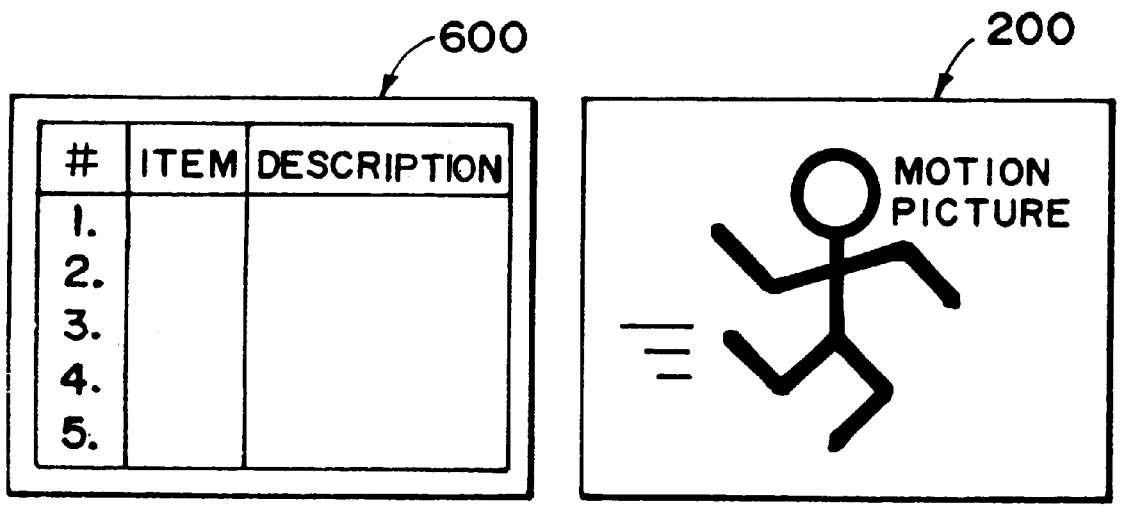

FIGS. 16A and 16B illustrate pictures displayed on the two liquid crystal display units 600 and 200, respectively. As shown in FIG. 16A, the third liquid crystal display unit 600 displays a picture principally comprising descriptive data including item-by-item descriptions. The picture is principally composed of still picture but can exhibit a sufficient reaction speed for a motion of a cursor, etc., in response to a user's manipulation, so that the user can specify particular data on this picture (screen).

On the other hand, as shown in FIG. 16B, the second liquid crystal display unit 200 is designed to display data designated by a user in the form of a full-motion picture. As a result, the user is provided with a single display system including the third liquid crystal display unit 600 characterized by a high definition and the second liquid crystal display unit 200 optimum for multi-color motion picture display for displaying harmonized pictures. Further, as a third liquid crystal display unit 600 having a higher frame frequency is used in this embodiment, it is possible to provide further improved display performances.

Figure 17:
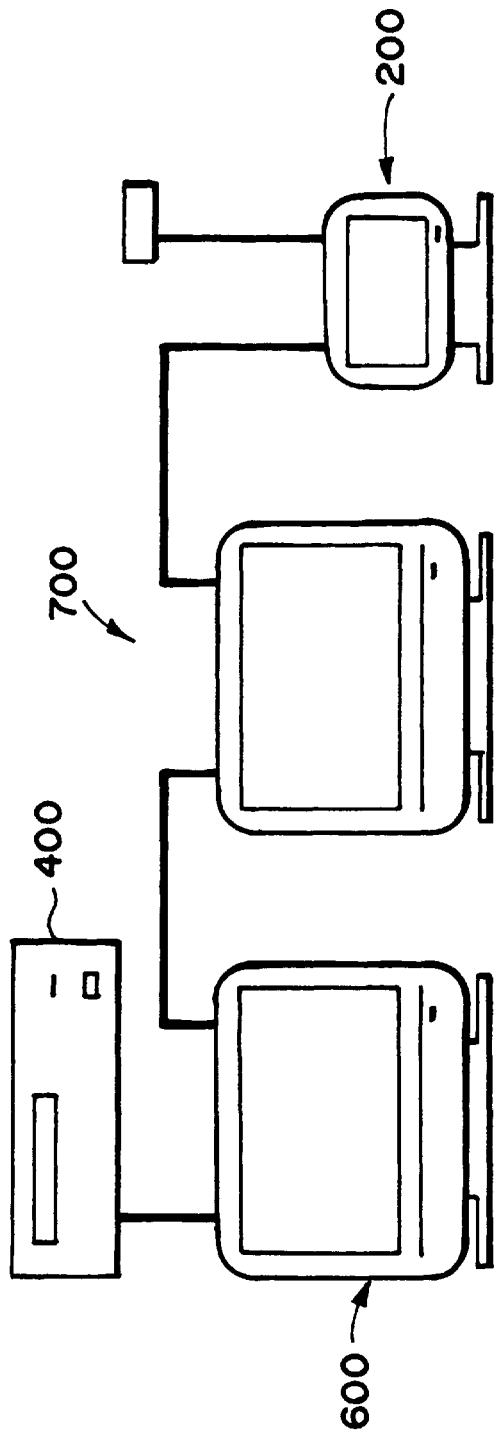

FIG. 17 illustrates a modification of the display apparatus system shown in FIG. 15. In the system, a fourth liquid crystal display unit 700 is further connected to the personal computer 400. The fourth liquid crystal display unit 700 may have an organization and an operation similar to those of the third liquid crystal display unit 600. In the personal computer, an application program including a motion picture and data including a detailed description to be provided to users may be operated.

Figure 18A:
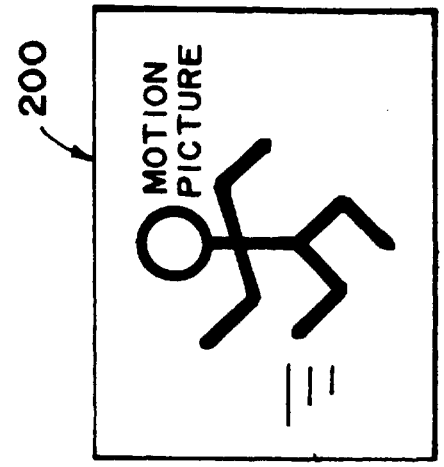
Figure 18B:
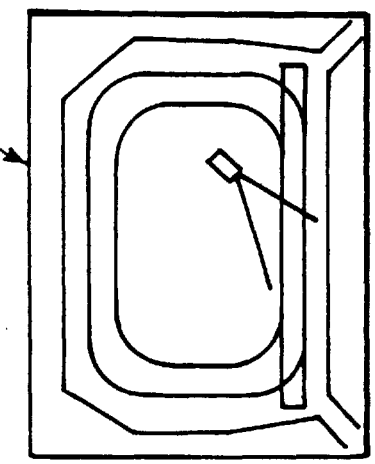
Figure 18C:
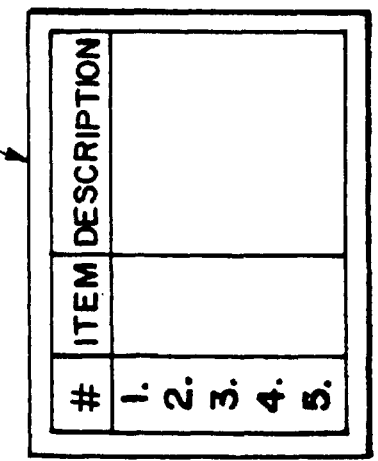

FIGS. 18A–18C illustrate pictures displayed on the liquid crystal display units 600, 700 and 200, respectively. As shown in FIG. 18A, the third liquid crystal display unit 600 displays a picture for data selection including item-by-item descriptions. The picture is composed principally of still pictures but can exhibit a sufficient reaction speed for a motion of a cursor, etc., in response to a user's manipulation so that the user can specify particular data on this picture (screen).

On the other hand, the fourth liquid crystal display unit 700 displays a picture for setting further detailed parameters regarding particular data as shown in FIG. 18B. On the other hand, the second liquid crystal display unit 200 displays a full-motion picture regarding the data specified by the user on the third and fourth liquid crystal display units (600 and 700.

For example, when a certain stadium is selected among the buildings in the world together with a particular game held in the stadium on the third liquid crystal display unit 600, a plan view of the stadium is displayed on the fourth liquid crystal display unit 700 and a user can designate a camera position and a lens setting on the plan view. Then, the second liquid crystal display unit 200 may display a motion picture, e.g., around a goal, of the specified game.

In this modification example, the third liquid crystal display unit 600 and the fourth display unit 700 may be driven at a combined frame frequency of ca. 5.0 Hz. Accordingly, in case where the third liquid crystal display unit 600 and the fourth liquid crystal display unit 700 renew displays simultaneously and at equal priority, they are respectively displayed at a frame frequency of ca. 2.5 Hz. However, e.g., in case where a user has completed the selection on the third liquid crystal display unit 600 and then is setting a camera work on the fourth liquid crystal display unit 700, the frame frequency of the fourth liquid crystal display unit can be increased to ca. 5.0 Hz at the maximum. Further, when only a small picture area is manipulated (rewritten) on the third liquid crystal display unit 600, a further higher response speed can be attained.

As described above, according to this embodiment, a plurality of high-definition and large-area liquid crystal display units (600, 700) of a memory characteristic each equipped with a line data buffer (611) having a capacity for a plurality of lines, and also a liquid crystal display unit (200) capably of easily displaying multi-color motion pictures, can be connected to a single data generator unit (400), thus allowing simultaneous enjoyment of advantages of the liquid crystal display units having different characteristics.

Further, as the liquid crystal display units 200, 600 and 700 having mutually different characteristics are connected to a single data generator unit, the data generator unit 400 is allowed to supply mutually closely associated data to these liquid crystal display units. Further, these liquid crystal display units 100 and 200 may be easily connected in series with a single picture bus, thus facilitating the user's connecting operation.

Further, as the data transfer schedule by the data generator unit 400 is determined by simple two rules, i.e., data transfer demands from the liquid crystal display units 200, 600 and 700 and numbers of continuous transfer lines by the units 200, 600 and 700, it is possible to freely select a number of connectable liquid crystal display units and a number of pixels on the respective liquid crystal display units except that only one liquid crystal display apparatus using a TFT liquid crystal display unit can be connected and a maximum total data transfer speed for the liquid crystal display units including FLC displayed devices 101 is constant, thus allowing an easy connection change.

Figure 19:
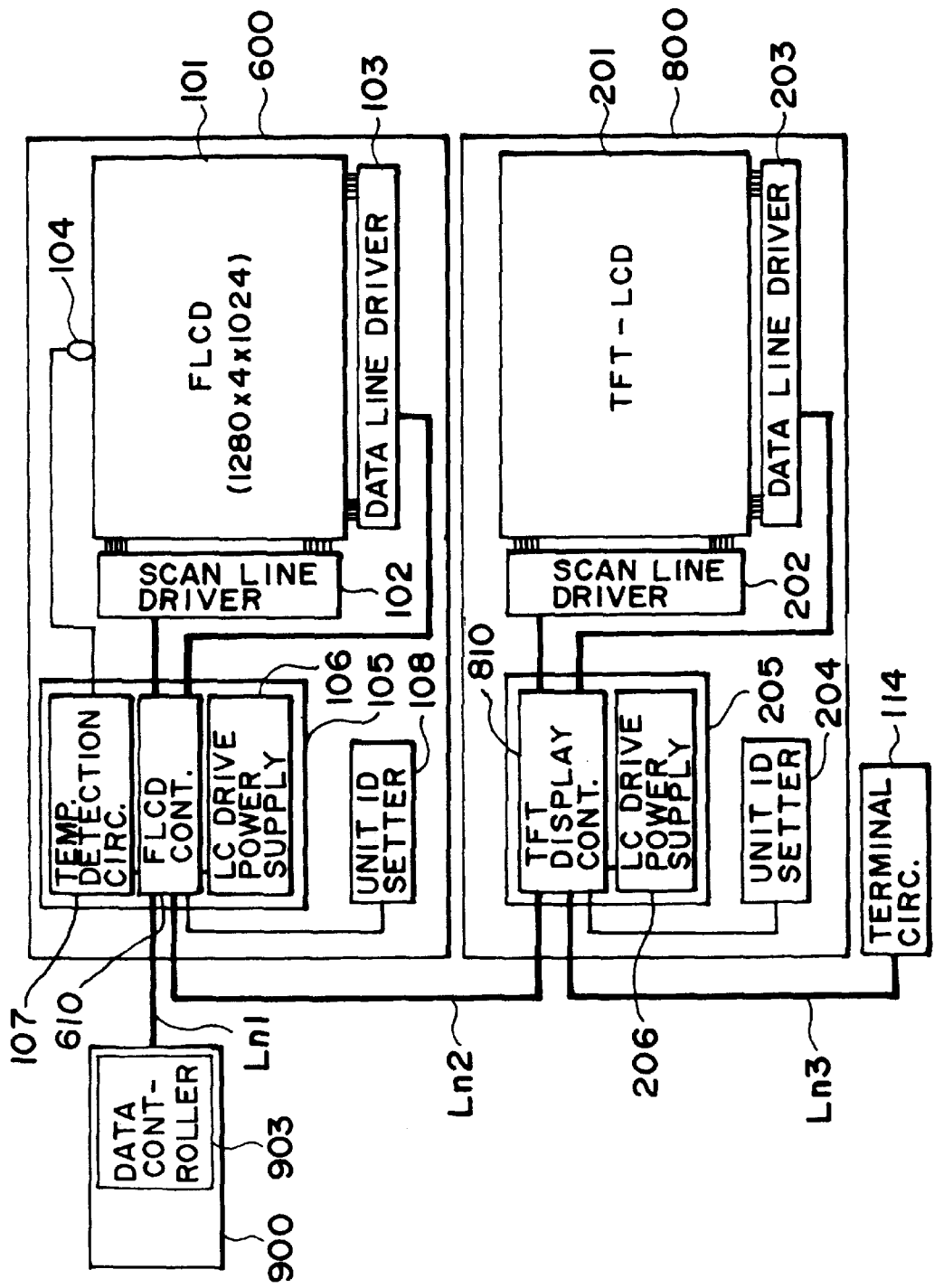
FIG. 19 is a block diagram of a display apparatus according to a third embodiment of the invention.
Figure 21:
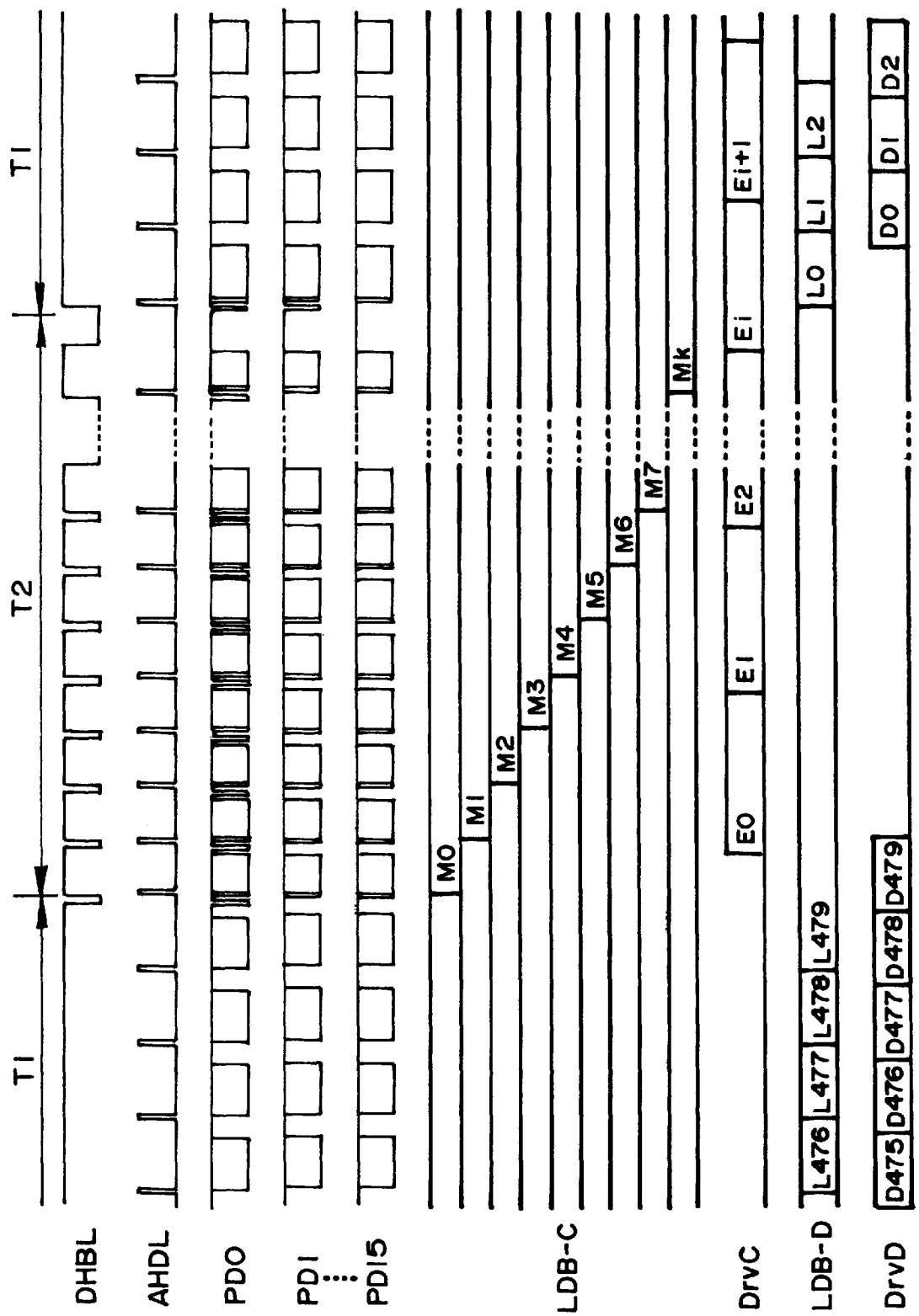
FIG. 21 illustrates a schedule of data transfer performed by a data controller in the data generator unit of the display apparatus.
Figure 22:
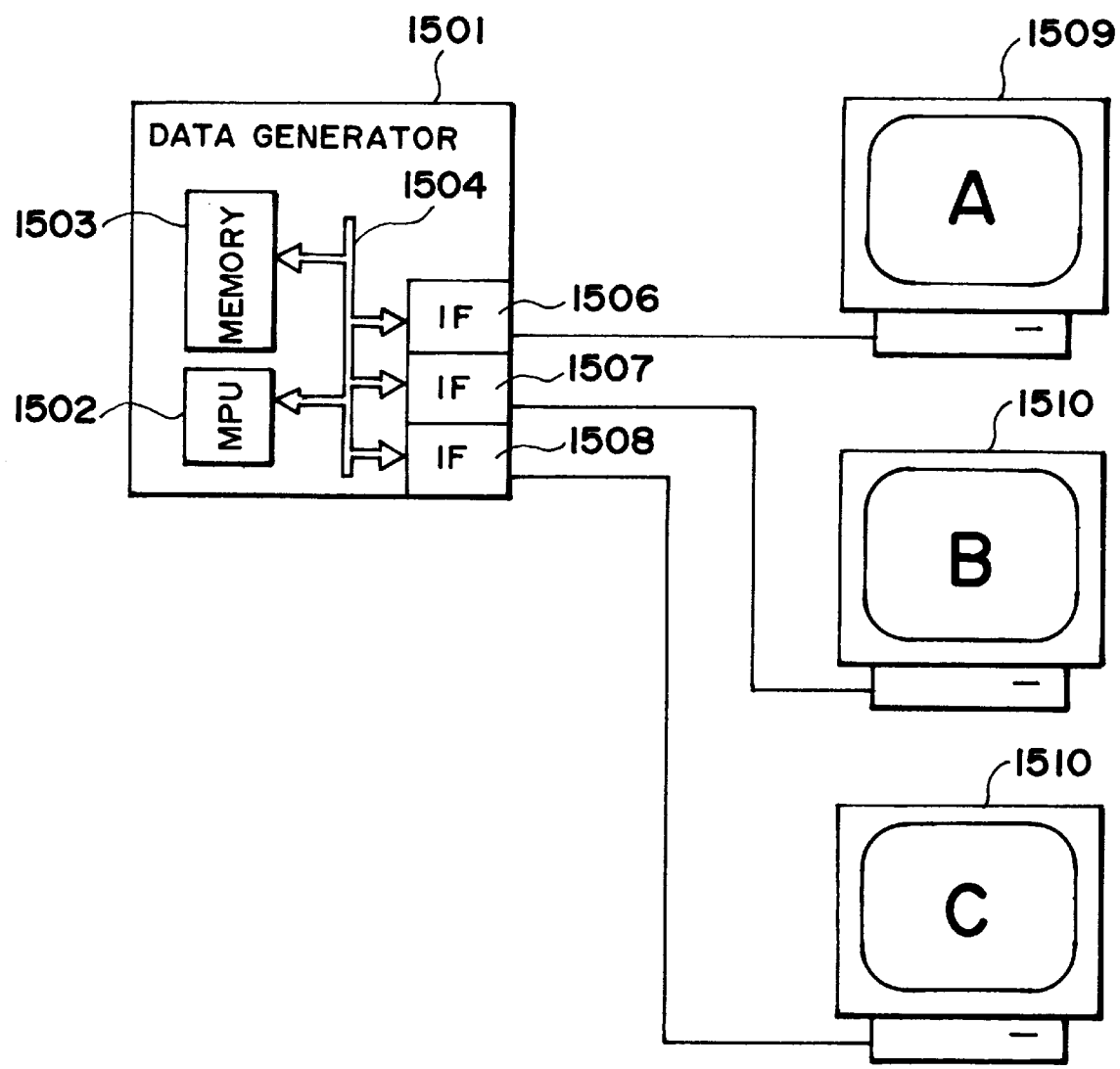
FIG. 22 is a block diagram of a conventional display apparatus.

Next, a description will be made on a third embodiment wherein the already-described second liquid crystal display unit 200 is provided with a display controller having a different organization. With reference to FIGS. 19–21, wherein identical or like numerals are used to denote identical or corresponding members as in the figures for illustrating the first and second embodiments.

FIG. 19 is a block diagram of a display apparatus according to this embodiment, including a fifth liquid crystal display unit 800 which in turn includes a TFT display device 201, and a TFT display controller 810 having an organization as shown in FIG. 20, and also a data generator unit.

In operation, when the condition for displaying one frame of the TFT display device 201 is ready, MPU 812 in the TFT display controller 810 sets "L" to a specific BYSYi corresponding to Unit ID set in the Unit ID setting means 204 from outside among signals BUSYi in a period of "L" of DHBL while monitoring the signal DHBL. For example, when "1" is set in the Unit ID setting means 204, "L" is set to BUSY1.

Thereafter, MPU 812 further monitors DHBL and when "H" of DHBL is detected, releases the transmitter 304 of the signal BUSYi. Then, when AHDL assumes, MPU 812 takes in signals PDi (i=0–15) and decode Unit ID.

Then, in case where the decoded Unit ID is identical to the value given by the Unit ID setting means 204, i.e., when the data supplied from the data generator unit 900 is those supplied to the display unit 200, MPU 812 instructs the line data buffer 811 to store the picture data.

At this time, in case where the driver control circuit 813 is ready for commencing a drive for a subsequent one scanning line, MPU 812 notifies the driver control circuit 813 so as to initiate scanning from the start of the TFT liquid crystal display device 201 regardless of the received address and instructs the driver controller 813 to drive one scanning line as soon as the picture data is stored in the line data buffer 811.

Further, also in the case where one line data has been received and then the signal AHDL assumes "H" without the signal DHBL assuming "L" to issue a data transfer demand signal, the picture data is immediately stored in the line data buffer 811, an increment is added to the scanning address by the MPU 812 side an the driver control circuit 813 is instructed to drive a subsequent scanning line. In other words, when the data transfer to the display unit 201 is once started in response to a data transfer demand, picture data for a plurality of lines is continuously received to effect a display.

Also in this embodiment, MPU 812 has been described as if the contains a CPU and operates on a program code but need not contain a CPU as far as it can effect the above-described operation similarly as in the first and second embodiments.

FIG. 21 is a time chart for illustrating a schedule of data transfer performed by the data controller 903 in the data generator unit 900, and drive of the third liquid crystal display unit 600 and the fifth liquid crystal display unit 800.

As shown in FIG. 8, in a period of "L" of DHBL set by the data controller 903, the FLC display controller 610 and the TFT controller 810 set their demand signals to be "L" to demand a picture data transfer if they are in a state ready for receiving fresh one line data.

At the beginning of the period T1, if the data controller 903 detects "L" of signal PD1 which is a data transfer demand signal from the fifth liquid crystal display unit 800 during a period of "L" of signal DHBL, the data controller 903 sends out one-line picture data L0 together with Unit ID of the fifth liquid crystal display unit 800. Then, the picture data L0 received by the line data buffer 811 (as shown at LDB-D) of the fifth liquid crystal display unit 800 is displayed at a drive period D0.

Regarding the data transfer to the fifth liquid crystal display unit 800, the transfer cycle period is constant so that, after completing transfer of the picture data L0, the data controller 903 does not lower the signal DHBL but again sets "H" of signal AHDL in synchronism with the transfer cycle to transfer picture data L1 for a subsequent display line and display it at D1. In this way, one frame picture data is continuously transferred.

On the other hand, when a period T2 corresponding to a vertical fly-back time of the fifth liquid crystal display unit 800 commences, no data transfer is demanded by the TFT display controller 810, so that the data controller 903 sets "L" to the signal DHBL and complies with data demand by the FLC display controller 610 and sends out picture data M0 together with Unit ID for the third liquid crystal display unit 600. Then, the picture data M0 (shown at LDB-A in FIG. 21) received by the time data buffer 610 is displayed on the FLC display device 101 in a drive period E0.

Then, in a subsequent period T1 after the vertical fly-back time of the third liquid crystal display unit 600 and corresponding to a subsequent one-frame scanning period of the fifth liquid crystal display unit 800, a data demand is again issued by the TFT display controller 810. When the data controller 903 once receiving a data demand from the TFT display controller 810, the data controller 903 continuously supplies picture data to the fifth liquid crystal display unit 800 without having the DHBL until one-frame data transfer is completed and until the number of display lines of the TFT display device 201 is reached.

Thus, in this embodiment, the fifth liquid crystal display unit 800 and the third liquid crystal display unit 600 are connected in one series of transfer lines Ln1, Ln2 and Ln3 to the data generator unit 900 so that data transfer to the third liquid crystal display unit 600 is performed in a period when data transfer to the fifth liquid crystal display unit 800 is not performed. This embodiment is different from the first and second embodiments in that the data transfer to the fifth liquid crystal display unit 800 is performed by transferring one frame data in response to one data transfer demand and in a prescribed cycle without being accompanied with addresses.

However, common advantages as in the first and second embodiments can be attained, such that a third liquid crystal display unit 600 having a memory characteristic and capable of displaying a high-definition and large area picture and a fifth liquid crystal display unit 800 capable of easily displaying multi-color motion pictures can be connected to a single data generator unit 900, thus allowing simultaneous enjoyment of advantages of the liquid crystal display units having different characteristics; that as the liquid crystal display units 600 and 800 are connected to a single data generator unit, the data generator unit 900 is allowed to supply mutually closely associated data to the two liquid crystal display units; and further that the two liquid crystal display units 600 and 800 may be easily connected in series with a single picture bus, thus facilitating the user's connecting operation.

In the above-described embodiments, the selection of scanning electrodes in a non-memory characteristic display device is effected according to a non-interlaced scheme, so that a vertical fly-back time (or blanking period) is placed between successive series of operation (frame scannings) each including selection of all the scanning electrodes one by one. In contrast thereto, in the case of an interlaced scanning scheme comprising a frame scanning including a plurality of vertical scannings (fields) in each of which the scanning electrodes are selected with skipping of at least one scanning electrode, it is possible to effect the picture data transfer to the memory characteristic display unit during a vertical fly-back time (blanking period) between successive field operations.

The memory characteristic display device used in the present invention can also be constituted as an electrochromic device instead of a ferroelectric or anti-ferroelectric chiral smectic liquid crystal device. Further, the non-memory characteristic display device used in the present invention can also be constituted as a plasma device or an electron discharge device instead of a TFT-active matrix liquid crystal device.

As described above, according to the present invention, a plurality of liquid crystal display units including one display unit using a non-memory characteristic display device and another display unit using a memory characteristic display device are connected to a common data generator unit, and data transfer to the display unit using a memory characteristic display device is performed in a blanking period wherein data transfer to the display unit using a non-memory characteristic is not performed, whereby liquid crystal display units having different display characteristics are driven to simultaneously display mutually closely related pictures.

What is claimed is:

1. A display apparatus, comprising: a common data generator unit for generating picture data, a plurality of display units each comprising a display device for displaying pictures based on the picture data, and a picture data transfer line connecting the common data generator unit with the plurality of display units, wherein said plurality of display units include a first display unit comprising a memory characteristic display device and a second display unit comprising a non-memory characteristic display device, which are driven so that picture data transfer from the common data generator unit to the first display unit comprising a memory characteristic display device through the picture data transfer line is performed in a blanking period when picture data transfer from the common data generator unit to the second display unit comprising a non-memory characteristic display device through the picture data transfer line is not performed, wherein said picture data includes data for designating one of said plurality of display units connected by the picture data transfer line, data for designating one of scanning lines of the designated display unit and display data for determining display states at pixels on the designated scanning line.

2. A display apparatus according to claim 1, wherein said plurality of display units are connected in series to the picture data transfer line.

3. A display apparatus according to claim 1, wherein said first display unit comprising a memory characteristic display device further includes a memory means for storing picture data for a plurality of scanning lines, said memory means having a capacity sufficient to store a maximum quantity of picture data transferable within the blanking period.

4. A display apparatus according to claim 1, wherein said memory characteristic display device is a display device using a ferroelectric liquid crystal.

5. A display apparatus according to any one of claims 1 to 4, wherein said picture data transfer line comprises a data signal line for passing picture data and a data demand signal from the display units, a discrimination signal line for passing a signal for discriminating whether data passing through said data signal line and a judgment signal line for judging whether the picture data sent to the data signal line is data for designating one of the display units or data for designating one of scanning lines.

6. A display apparatus, comprising: a common data generator unit for generating picture data, a first display unit comprising a memory characteristic display device, a second display unit comprising a non-memory characteristic display device, and a data transfer apparatus for transferring picture data for picture display from the common data generator unit to the first and second display units through a common output line,
wherein said data transfer apparatus includes control means for outputting picture data from the common data generator unit to the second display unit through the common output line within each of successive prescribed cycle periods between which a blanking period is placed, and for outputting picture data from the common data generator unit to the first display unit through the common output line in the blanking period,
wherein said picture data includes data for designating one of said first and second display units connected by the common output line, data for designating one of scanning lines of the designated display unit and display data for determining display states at pixels on the designated scanning line.

7. A display apparatus according to claim 1 or 6, wherein one cycle period for outputting picture data to the second display unit is longer than one cycle period for outputting picture data to the first display unit.

8. A display apparatus according to claim 1 or 6, wherein picture data for one frame is outputted to one cycle period for the second display unit, and picture data less than one frame data is outputted to one cycle period for the first display unit.

9. A display apparatus according to claim 1 or 6, wherein said memory characteristic display device comprises a device using a chiral smectic liquid crystal.

10. A display apparatus according to claim 1 or 6, wherein said non-memory characteristic display device comprises an active matrix liquid crystal device, a plasma device or an electron discharge device.

11. A display apparatus according to claim 1, wherein said picture data includes data for designating one of said plurality of display units connected by a picture data transfer line.

12. A display apparatus according to claim 6, wherein said picture data includes data for designating one of the first and second display units connected by a picture data transfer line.

13. A data transfer apparatus for transferring picture data for picture display to a first display unit comprising a memory characteristic display device and a second display unit comprising a non-memory characteristic display device via a common output line,
wherein said data transfer apparatus includes control means for outputting picture data to the second display unit within each of successive prescribed cycle periods between which a blanking period is placed, and for outputting picture data to the first display unit in the blanking period.

14. A data transfer apparatus according to 13, wherein one cycle period for outputting picture data to the second display unit is longer than one cycle period for outputting picture data to the first display unit.

15. A data transfer apparatus according to claim 13, wherein picture data for one frame is outputted to one cycle period for the second display unit, and picture data less than one frame data is outputted to one cycle period for the first display unit.

16. A data transfer apparatus according to claim 13, wherein said picture data includes data for designating one of said plurality of display units connected by a picture data transfer line.

* * * * *

UNITED STATES PATENT AND TRADEMARK OFFICE
CERTIFICATE OF CORRECTION

PATENT NO. : 6,043,798
DATED : March 28, 2000
INVENTOR(S) : Takashi Yamaoto et al.

It is certified that error appears in the above-identified patent and that said Letters Patent is hereby corrected as shown below:

COLUMN 3:

Line 61, "outsides." should read --outside.--.

COLUMN 5:

Line 5, "outsides." should read --outside.--.

COLUMN 6:

Line 42, "case" should read -- the case--;
    Line 44, "is those" should read --is that--; and
    Line 63, "it is" should read --its--.

COLUMN 7:

Line 21, "case should read --the case--;
    Line 23, "is those" should read --is that--; and
    Line 40, "period" should read --period, --.

COLUMN 8:

Line 41, "receiving" should read --receives--.

COLUMN 10:

Line 61, "case" should read --the case--; and
    Line 63, "is those" should read --is that--.

UNITED STATES PATENT AND TRADEMARK OFFICE
CERTIFICATE OF CORRECTION

PATENT NO.    : 6,043,798
DATED         : March 28, 2000
INVENTOR(S)   : Takashi Yamaoto et al.

It is certified that error appears in the above-identified patent and that said Letters Patent is hereby corrected as shown below:

COLUMN 11:

Line 11, "space" should read --space, --;
      Line 17, "decode" should read --decodes--; and
              "diver" should read --driver--;
      Line 24, "assumed" should read --assumes--: and
      Line 27, "case" should read --the case--.

COLUMN 12:

Line 12, "transfers," should read --transfers), --; and
      Line 17, "receiving" should read --receives--.

COLUMN 13:

Line 30, "700." should read --700).--;
      Line 42, "case" should read --the case--;
      Line 46, "case" should read --the case--; and
      Line 59, "capably" should read -- capable--.

COLUMN 14:

Line 6,  "simple two" should read -- two simple--;
      Line 20, "wherein" should be deleted:
      Line 39, "case" should real --the case--;
      Line 41, "is those" should read --is that--;
      Line 44, "case" should read --the case--;
      Line 57, "an" should read --and--; and
      Line 64, "the contains" should read --it contains--.

UNITED STATES PATENT AND TRADEMARK OFFICE
CERTIFICATE OF CORRECTION

PATENT NO. : 6,043,798
DATED : March 28, 2000
INVENTOR(S) : Takashi Yamaoto et al.

It is certified that error appears in the above-identified patent and that said Letters Patent is hereby corrected as shown below:

COLUMN 16:

Line 1, "that as" should read --that is,--

Signed and Sealed this

Fifth Day of June, 2001

*Attest:*

*Attesting Officer*

NICHOLAS P. GODICI
*Acting Director of the United States Patent and Trademark Office*